United States Patent
Ramakrishnan

(10) Patent No.: US 12,413,974 B2
(45) Date of Patent: Sep. 9, 2025

(54) SECURITY MANAGEMENT SERVICE FOR INTERNET-OF-THINGS DEVICES

(71) Applicant: AT&T Intellectual Property I, L.P., Atlanta, GA (US)

(72) Inventor: Senthil Ramakrishnan, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 328 days.

(21) Appl. No.: 17/956,906

(22) Filed: Sep. 30, 2022

(65) Prior Publication Data

US 2024/0114339 A1    Apr. 4, 2024

(51) Int. Cl.
*H04W 12/069*    (2021.01)
*H04W 60/00*    (2009.01)

(52) U.S. Cl.
CPC ......... *H04W 12/069* (2021.01); *H04W 60/00* (2013.01)

(58) Field of Classification Search
CPC ............................ H04W 12/069; H04W 60/00
See application file for complete search history.

(56) References Cited

U.S. PATENT DOCUMENTS 9,831,903 B1 * 11/2017 Narasimhan ........ H04L 41/0893
2022/0070674 A1 * 3/2022 Russell ................. H04W 4/029
2024/0037198 A1 * 2/2024 Albero .................. G06F 21/316

* cited by examiner

*Primary Examiner* — Mazda Sabouri
(74) *Attorney, Agent, or Firm* — Hartman & Citrin LLC

(57) ABSTRACT

A security management service for Internet-of-things devices can obtain, from an Internet-of-things device and via a cellular network, a request by the Internet-of-things device to register with the cellular network, the Internet-of-things device including a universal integrated circuit card that stores a unique identifier for the Internet-of-things device and a cellular transceiver. The security management service can obtain behavioral data describing activity associated with the Internet-of-things device and can determine, based on the identity data and the behavioral data, if the Internet-of-things device is operating normally and as expected and if the Internet-of-things device is under the control of any unauthorized entity before allowing the Internet-of-things device to register with the cellular network.

20 Claims, 8 Drawing Sheets

SECURITY MANAGEMENT SERVICE FOR INTERNET-OF-THINGS DEVICES

BACKGROUND

Network Identity and authentication are often used in cellular networks. Cellular devices can be equipped with a subscriber identity module ("SIM") or other form of universal integrated circuit card ("UICC"). The universal integrated circuit card can contain a unique identity that can be used to request and/or provide network resources such as voice connectivity, data connectivity, Internet access, etc. Because cellular-connected devices generally include some form of a universal integrated circuit card, identity of cellular devices and other security considerations often can be managed and/or tracked by cellular network providers.

For non-cellular-enabled devices, security processes and/or technologies can vary widely. Some resources may require certificates to communicate, and various types of authentication and/or identity determination techniques are used to attempt to identify and/or authorize various types of communications associated with Internet-of-things devices. In some cases, proprietary authentication and/or identity technologies are used for Internet-of-things devices, which can complicate management networks and/or network resources.

SUMMARY

The present disclosure is directed to security management service for Internet-of-things devices. One or more Internet-of-things devices can include a universal integrated circuit card. The universal integrated circuit card can store universally unique and immutable identity data associated with the Internet-of-things device, and the Internet-of-things device also can execute a security application that can be executed by the Internet-of-things device to access identity data, request registration with a cellular network, store and/or provide certificates, and/or to perform other functionality. The Internet-of-things device can request registration with the cellular network by sending registration data to a security management service, which can be hosted and/or executed by the server computer.

The security management service can analyze or trigger analysis of the identity data and/or other data describing behavior of the Internet-of-things device to determine if the Internet-of-things device is to be registered with the cellular network. In particular, the security management service can determine, based on behavior of the Internet-of-things device, the identity data, identifying information stored in the identity database, and information stored in the device inventory, if the Internet-of-things device is accurately identified (e.g., that the identity data matches the known identifying information associated with the Internet-of-things device), that the Internet-of-things device is operating normally and as expected, and that the Internet-of-things device is not currently under the control of any unauthorized entity and/or malware. If the security management service so determines, the security management service can register and/or trigger registration of the Internet-of-things device with the cellular network.

At some time after registering with the cellular network, the Internet-of-things device can request access to a resource on the network such as one or more third party services, one or more components of network infrastructure, and/or one or more cloud applications. The security management service can determine if the access requested by the Internet-of-things device (e.g., by way of an implicit or explicit resource access request) is to be granted. In various embodiments, the security management service can again analyze or trigger analysis of the identity data and/or other data describing behavior of the Internet-of-things device to determine if the Internet-of-things device is to be allowed to access the resource as requested via the cellular network. The security management service can determine, based on behavior of the Internet-of-things device, the identity data, identifying information stored in the identity database, and information stored in the device inventory, if the Internet-of-things device is accurately identified (e.g., that the identity data matches the known identifying information associated with the Internet-of-things device), that the Internet-of-things device is operating normally and as expected, and that the Internet-of-things device is not currently under the control of any unauthorized entity and/or malware. If the security management service so determines, the security management service can allow the requested access to the resource.

If the access is granted, the security management service also can determine (and/or invoke the credential manager to determine) if a certificate is required for communications between the Internet-of-things device and the resource. If the certificate is required for communications between the Internet-of-things device and the resource, the security management service can provide the certificate to the resource. The security management service also can determine (and/or invoke the routing controller to determine) a routing for session data between the Internet-of-things device and the resource. The routing can include a direct session between the Internet-of-things device and the resource or an indirect route between the Internet-of-things device via the server computer. These and other aspects of the concepts and technologies disclosed herein for a security management service for Internet-of-things devices will be illustrated and described in additional detail herein.

According to one aspect of the concepts and technologies disclosed herein, a system is disclosed. The system can include a processor and a memory. The memory can store computer-executable instructions that, when executed by the processor, cause the processor to perform operations. The operations can include obtaining, from an Internet-of-things device and via a portion of a cellular network, registration data. Obtaining the registration data can correspond to a request by the Internet-of-things device to register with the cellular network, and the Internet-of-things device includes a universal integrated circuit card that stores a unique identifier for the Internet-of-things device and a cellular transceiver. The operations further can include obtaining, from the registration data, identity data that includes the unique identifier for the Internet-of-things device; obtaining behavioral data associated with the Internet-of-things device, the behavioral data describing activity associated with the Internet-of-things device; determining, based on the identity data and the behavioral data, if the Internet-of-things device is operating normally and as expected and if the Internet-of-things device is under the control of any unauthorized entity; and if a determination is made that the Internet-of-things device is operating normally and as expected and that the Internet-of-things device is not under the control of any unauthorized entity, allowing the Internet-of-things device to register with the cellular network.

In some embodiments, the operations can further include receiving, from the Internet-of-things device and via the cellular network, another request to access a resource via another network; analyzing identity information associated with the Internet-of-things device and the behavioral data to determine if the access requested is to be granted; and if a determination is made that the Internet-of-things device is operating normally and as expected and that the Internet-of-things device is not under the control of any unauthorized entity, allowing the Internet-of-things device to access the resource via the cellular network. In some embodiments, the operations can further include determining if the resource requires a certificate associated with the Internet-of-things device to allow the Internet-of-things device to access the resource; and if a determination is made that the resource requires the certificate, providing the certificate to the resource, wherein the certificate is obtained with the registration data and from the universal integrated circuit card.

In some embodiments, the operations can further include determining a routing for session data exchanged between the Internet-of-things device and the resource during a session, the routing including a direct connection between the Internet-of-things device and the resource via the cellular network and the other network. In some embodiments, the operations can further include determining a routing for session data exchanged between the Internet-of-things device and the resource during a session, the routing including an indirect connection between the Internet-of-things device and the resource, the indirect connection including communications via the cellular network, a server computer that executes a security management service, and the other network. In some embodiments, the resource can include a cloud application. In some embodiments, the Internet-of-things device can store a certificate in the universal integrated circuit card at the Internet-of-things device, wherein the certificate is stored in a secure memory of the universal integrated circuit card.

According to another aspect of the concepts and technologies disclosed herein, a method is disclosed. The method can include obtaining, at a server computer including a processor and from an Internet-of-things device and via a portion of a cellular network, registration data. Obtaining the registration data can correspond to a request by the Internet-of-things device to register with the cellular network, and the Internet-of-things device includes a universal integrated circuit card that stores a unique identifier for the Internet-of-things device and a cellular transceiver. The method further can include obtaining, by the processor and from the registration data, identity data that includes the unique identifier for the Internet-of-things device; obtaining, by the processor, behavioral data associated with the Internet-of-things device, the behavioral data describing activity associated with the Internet-of-things device; determining, by the processor and based on the identity data and the behavioral data, if the Internet-of-things device is operating normally and as expected and if the Internet-of-things device is under the control of any unauthorized entity; and if a determination is made that the Internet-of-things device is operating normally and as expected and that the Internet-of-things device is not under the control of any unauthorized entity, allowing, by the processor, the Internet-of-things device to register with the cellular network.

In some embodiments, the method can further include receiving, from the Internet-of-things device and via the cellular network, another request to access a resource via another network; analyzing identity information associated with the Internet-of-things device and the behavioral data to determine if the access requested is to be granted; and if a determination is made that the Internet-of-things device is operating normally and as expected and that the Internet-of-things device is not under the control of any unauthorized entity, allowing the Internet-of-things device to access the resource via the cellular network. In some embodiments, the method can further include determining if the resource requires a certificate associated with the Internet-of-things device to allow the Internet-of-things device to access the resource; and if a determination is made that the resource requires the certificate, providing the certificate to the resource, wherein the certificate is obtained with the registration data and from the universal integrated circuit card.

In some embodiments, the method can further include determining a routing for session data exchanged between the Internet-of-things device and the resource during a session, the routing including a direct connection between the Internet-of-things device and the resource via the cellular network and the other network. In some embodiments, the method can further include determining a routing for session data exchanged between the Internet-of-things device and the resource during a session, the routing including an indirect connection between the Internet-of-things device and the resource, the indirect connection including communications via the cellular network, a server computer that executes a security management service, and the other network. In some embodiments, the resource can include a cloud application. In some embodiments, the Internet-of-things device can store a certificate in the universal integrated circuit card at the Internet-of-things device, wherein the certificate is stored in a secure memory of the universal integrated circuit card.

According to yet another aspect of the concepts and technologies disclosed herein, a computer storage medium is disclosed. The computer storage medium can store computer-executable instructions that, when executed by a processor, cause the processor to perform operations. The operations can include obtaining, from an Internet-of-things device and via a portion of a cellular network, registration data. Obtaining the registration data can correspond to a request by the Internet-of-things device to register with the cellular network, and the Internet-of-things device includes a universal integrated circuit card that stores a unique identifier for the Internet-of-things device and a cellular transceiver. The operations further can include obtaining, from the registration data, identity data that includes the unique identifier for the Internet-of-things device; obtaining behavioral data associated with the Internet-of-things device, the behavioral data describing activity associated with the Internet-of-things device; determining, based on the identity data and the behavioral data, if the Internet-of-things device is operating normally and as expected and if the Internet-of-things device is under the control of any unauthorized entity; and if a determination is made that the Internet-of-things device is operating normally and as expected and that the Internet-of-things device is not under the control of any unauthorized entity, allowing the Internet-of-things device to register with the cellular network.

In some embodiments, the operations can further include receiving, from the Internet-of-things device and via the cellular network, another request to access a resource via another network; analyzing identity information associated with the Internet-of-things device and the behavioral data to determine if the access requested is to be granted; and if a determination is made that the Internet-of-things device is operating normally and as expected and that the Internet-of-things device is not under the control of any unauthorized entity, allowing the Internet-of-things device to access the resource via the cellular network. In some embodiments, the operations can further include determining if the resource requires a certificate associated with the Internet-of-things device to allow the Internet-of-things device to access the resource; and if a determination is made that the resource requires the certificate, providing the certificate to the resource, wherein the certificate is obtained with the registration data and from the universal integrated circuit card.

In some embodiments, the operations can further include determining a routing for session data exchanged between the Internet-of-things device and the resource during a session, the routing including a direct connection between the Internet-of-things device and the resource via the cellular network and the other network. In some embodiments, the operations can further include determining a routing for session data exchanged between the Internet-of-things device and the resource during a session, the routing including an indirect connection between the Internet-of-things device and the resource, the indirect connection including communications via the cellular network, a server computer that executes a security management service, and the other network. In some embodiments, the resource can include a cloud application. In some embodiments, the Internet-of-things device can store a certificate in the universal integrated circuit card at the Internet-of-things device, wherein the certificate is stored in a secure memory of the universal integrated circuit card.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
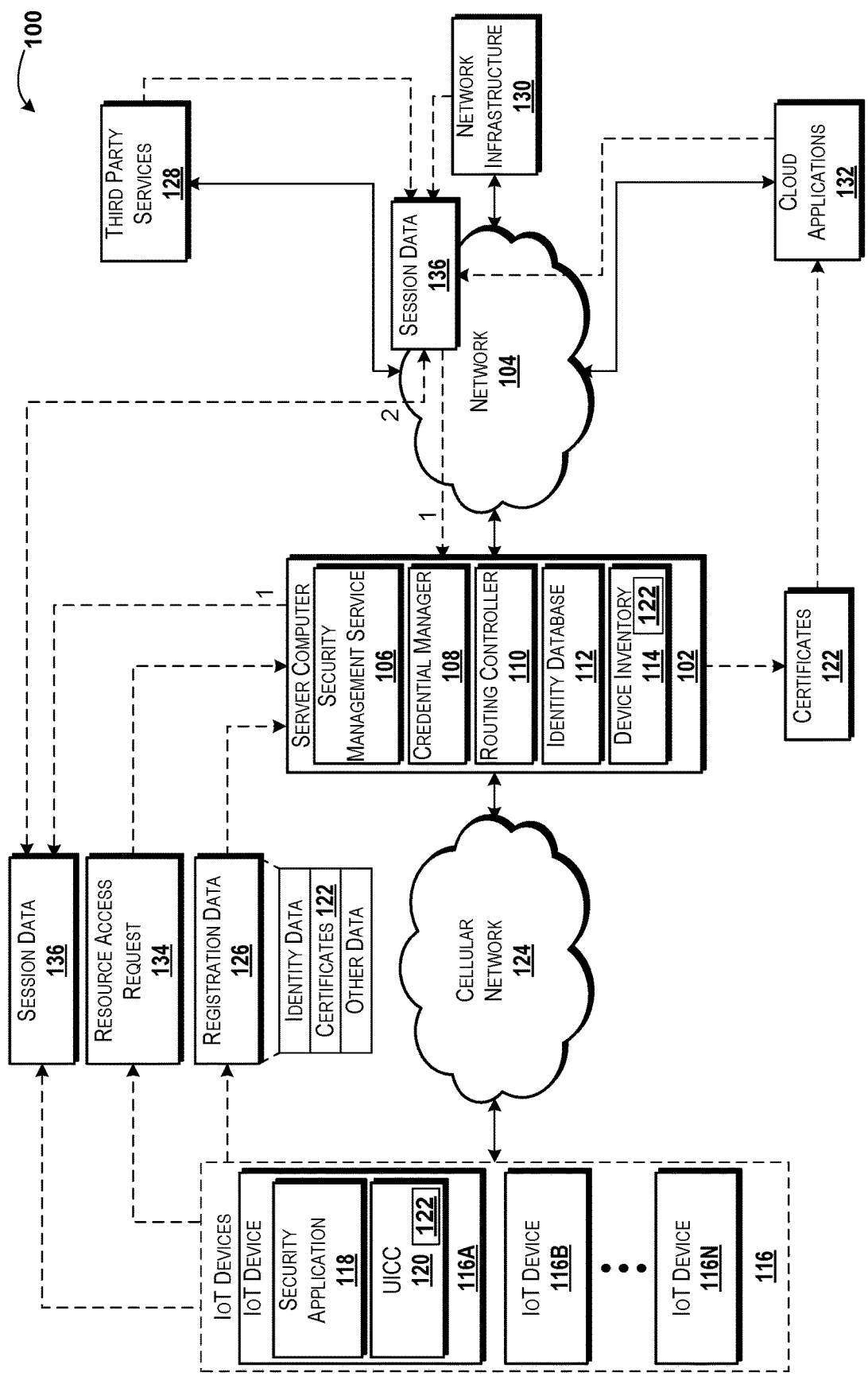
FIG. 1 is a system diagram illustrating an illustrative operating environment for various embodiments of the concepts and technologies described herein.

The following detailed description is directed to security management service for Internet-of-things devices. One or more Internet-of-things devices can include a universal integrated circuit card. The universal integrated circuit card can store universally unique and immutable identity data associated with the Internet-of-things device, and the Internet-of-things device also can execute a security application that can be executed by the Internet-of-things device to access identity data, request registration with a cellular network, store and/or provide certificates, and/or to perform other functionality. The Internet-of-things device can request registration with the cellular network by sending registration data to a security management service, which can be hosted and/or executed by the server computer.

The security management service can analyze or trigger analysis of the identity data and/or other data describing behavior of the Internet-of-things device to determine if the Internet-of-things device is to be registered with the cellular network. In particular, the security management service can determine, based on behavior of the Internet-of-things device, the identity data, identifying information stored in the identity database, and information stored in the device inventory, if the Internet-of-things device is accurately identified (e.g., that the identity data matches the known identifying information associated with the Internet-of-things device), that the Internet-of-things device is operating normally and as expected, and that the Internet-of-things device is not currently under the control of any unauthorized entity and/or malware. If the security management service so determines, the security management service can register and/or trigger registration of the Internet-of-things device with the cellular network.

At some time after registering with the cellular network, the Internet-of-things device can request access to a resource on the network such as one or more third party services, one or more components of network infrastructure, and/or one or more cloud applications. The security management service can determine if the access requested by the Internet-of-things device (e.g., by way of an implicit or explicit resource access request) is to be granted. In various embodiments, the security management service can again analyze or trigger analysis of the identity data and/or other data describing behavior of the Internet-of-things device to determine if the Internet-of-things device is to be allowed to access the resource as requested via the cellular network. The security management service can determine, based on behavior of the Internet-of-things device, the identity data, identifying information stored in the identity database, and information stored in the device inventory, if the Internet-of-things device is accurately identified (e.g., that the identity data matches the known identifying information associated with the Internet-of-things device), that the Internet-of-things device is operating normally and as expected, and that the Internet-of-things device is not currently under the control of any unauthorized entity and/or malware. If the security management service so determines, the security management service can allow the requested access to the resource.

If the access is granted, the security management service also can determine (and/or invoke the credential manager to determine) if a certificate is required for communications between the Internet-of-things device and the resource. If the certificate is required for communications between the Internet-of-things device and the resource, the security management service can provide the certificate to the resource. The security management service also can determine (and/or invoke the routing controller to determine) a routing for session data between the Internet-of-things device and the resource. The routing can include a direct session between the Internet-of-things device and the resource or an indirect route between the Internet-of-things device via the server computer. These and other aspects of the concepts and technologies disclosed herein for a security management service for Internet-of-things devices will be illustrated and described in additional detail herein While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for security management service for Internet-of-things devices will be described, according to an illustrative embodiment. The operating environment 100 shown in FIG. 1 includes a server computer 102. The server computer 102 can operate in communication with and/or as part of a communications network ("network") 104, though this is not necessarily the case in all embodiments.

According to various embodiments, the functionality of the server computer 102 may be provided by one or more server computers, desktop computers, mobile telephones, laptop computers, set-top boxes, other computing systems, and the like. It should be understood that the functionality of the server computer 102 may be provided by a single device, by two or more similar devices, and/or by two or more dissimilar devices. For purposes of describing the concepts and technologies disclosed herein, the server computer 102 is described herein as a server computer such as an application server, a web server, or the like. It should be understood that this embodiment is illustrative, and should not be construed as being limiting in any way.

The server computer 102 can execute an operating system (not labeled in FIG. 1) and one or more application programs such as, for example, a security management service 106, a credential manager 108, and a routing controller 110. These application programs can generate, store, and/or interact with an identity database 112, a device inventory 114, and/or other data sources as will be illustrated and described herein. The operating system can include a computer program that can control the operation of the server computer 102. The application programs can include executable programs that can be configured to execute on top of the operating system to provide various functions as illustrated and described herein.

Although the security management service 106, the credential manager 108, and the routing controller 110 are illustrated as components of the server computer 102, it should be understood that each of these components, or combinations thereof, may be embodied as or in stand-alone devices or components thereof operating as part of or in communication with the network 104 and/or the server computer 102. Similarly, while the device inventory 114 and the identity database 112 are illustrated as being stored in a data storage location (e.g., a memory) of the server computer 102, it should be understood that these and other data can be stored in data repositories, data storage devices, databases, data stores, and/or other data storage resources associated with and/or accessible to the server computer 102. As such, the illustrated embodiment should be understood as being illustrative of only some contemplated embodiments and should not be construed as being limiting in any way.

The security management service 106 can be configured to manage communications of one or more Internet-of-things devices 116A-N (hereinafter collectively and/or generically referred to as "Internet-of-things devices 116"). One or more of the Internet-of-things devices 116 can execute a security application 118 and one or more identity modules such as a SIM, UICC, or the like (labeled in FIG. 1 and hereinafter referred to as the "universal integrated circuit card 120"). The security application 118 of the Internet-of-things device 116 can be configured to collect contextual data, generate requests for registration, generate requests to access resources, to obtain and/or store credentials, and/or other functionality of the Internet-of-things device 116 as illustrated and described herein. According to various embodiments of the concepts and technologies disclosed herein, Internet-of-things devices 116 for which security is managed by the security management service 106 can include the universal integrated circuit card 120. According to various embodiments, the universal integrated circuit card 120 of the Internet-of-things devices 116 can store one or more certificates 122 or other identity and/or authentication technologies (e.g., tokens, or the like). It should be understood that this example is illustrative, and therefore should not be construed as being limiting in any way.

According to various embodiments of the concepts and technologies disclosed herein, the server computer 102 and the Internet-of-things devices 116 can be configured for wireless communications via a cellular network 124. Thus, although not illustrated in FIG. 1, the Internet-of-things devices 116 also can include wireless transceivers. An example architecture for some embodiments of the Internet-of-things devices 116 is illustrated and described below with reference to FIG. 7.

According to various embodiments of the concepts and technologies disclosed herein, the security management service 106 can be configured to authenticate the Internet-of-things devices 116 and/or manage communications associated with the Internet-of-things devices 116. In particular, the Internet-of-things devices 116 can be configured to register for communications via the cellular network 124. In particular, the Internet-of-things devices 116 can be configured to request registration with the cellular network 124 at various times such as on power up, when a transceiver is activated, at other times, or the like. According to various embodiments, the Internet-of-things devices 116 can request the registration via exchanging one or more instances of registration data 126 with the server computer 102. Because registration can be requested in additional and/or alternative manners, it should be understood that this example is illustrative, and therefore should not be construed as being limiting in any way.

The registration data 126 generated by the Internet-of-things device 116 can include, in some embodiments, a request to access the cellular network 124 (e.g., a ping to a cellular tower requesting access, or the like). In some instances, the server computer 102 can be configured to obtain or receive the registration data 126 and determine, based on the registration data 126 and/or other information, if the Internet-of-things device 116 is to be registered with the cellular network 124. In some embodiments, the registration data 126 can include identity data, one or more certificates 122, and/or other data. It should be understood that this example is illustrative, and therefore should not be construed as being limiting in any way.

The identity data can include a unique and/or immutable identifier for the Internet-of-things device 116. The identity data therefore can correspond to a string of characters that can uniquely identify a single device and, in theory, a user associated with the device. Thus, the identity data illustrated and described herein can include any format of unique identifier such as a globally unique identifier ("GUID") or other string or object that can uniquely identify one, and only one, of the Internet-of-things devices 116. As such, the security management service 106 can know, based on the identity data included in the registration data 126, exactly what device (e.g., one of the Internet-of-things devices 116) has generated the registration data 126. It should be understood that this example is illustrative, and therefore should not be construed as being limiting in any way.

In various embodiments of the concepts and technologies disclosed herein, the universal integrated circuit card 120 can also store one or more certificates 122. Thus, for example, a certificate 122 can be stored locally at one of the Internet-of-things devices 116, for example, in a secure memory portion of the universal integrated circuit card 120. In various embodiments, a user or other entity can load a certificate 122 to the universal integrated circuit card 120 for use at various times and/or for various purposes as will be illustrated and described herein. Additionally, or alternatively, the universal integrated circuit card 120 can be preloaded or pre-flashed with a certificate 122 for use in association with secure resources. Thus, as will be explained in more detail herein, the security management service 106 can be configured to obtain and store the certificate 122 associated with a particular Internet-of-things device 116 and to store the certificate 122 to provide to resources that request a certificate 122. In some other embodiments, the security management service 106 can be configured to request the certificate 122 from the Internet-of-things device 116 when a communication requires the certificate 122. Thus, it can be appreciated that the server computer 102 can store or obtain one or more certificates 122. It should be understood that this example is illustrative, and therefore should not be construed as being limiting in any way.

The other data can include other information associated with the Internet-of-things device 116 such as, for example, contextual information that describes how the Internet-of-things device 116 is being used and/or has been used in the past. Thus, the other data can be used by the security management service 106 to evaluate behavior of the Internet-of-things device 116 to determine if the Internet-of-things device 116 is operating as expected and/or normally, if a requested registration or communication is expected, if any malware or unauthorized control of the Internet-of-things device 116 is detected, for other reasons, or the like. Thus, the registration data 126 can include information that may be used to authorize (or not authorize) registration and/or communications associated with the Internet-of-things device 116 via the cellular network 124. It should be understood that this example is illustrative, and therefore should not be construed as being limiting in any way.

The security management service 106 can be configured to detect the request to register with the cellular network 124 (e.g., via receipt of the registration data 126) and to determine if the Internet-of-things device 116 is to be registered with the cellular network 124. In particular, the security management service 106 can be configured to access and analyze, or to invoke the credential manager 108 to access and analyze, the registration data 126 (e.g., the identity data and the other data), and can obtain and analyze the device inventory 114 and/or identity database 112 to determine if the identity associated with the Internet-of-things device 116 is authorized to register with the cellular network 124.

The security management service 106 also can be configured to determine, based on performing an anomaly detection procedure and/or executing an anomaly detection module of the security management service 106, if the Internet-of-things device 116 is operating normally and/or as expected. The security management service 106 also can determine, e.g., based on performing threat intelligence and/or executing a threat intelligence module of the security management service 106, if the Internet-of-things device 116 is infected and/or otherwise under the control of any unauthorized entity or process. Based on these and/or other considerations as illustrated and described herein, the security management service 106 can determine if the Internet-of-things device 116 is to be registered with the cellular network 124.

In particular, if the security management service 106 determines that the identity data (e.g., the unique identity stored in the universal integrated circuit card 120) associated with the Internet-of-things device 116 is authorized to register with the cellular network 124; that the corroborating identity information matches the identity data obtained from the universal integrated circuit card 120 of the Internet-of-things device 116; that the Internet-of-things device 116 is operating as expected and without anomalies; and that no malware and/or unauthorized control of the Internet-of-things device 116 is detected; the Internet-of-things device 116 can be determined to be entitled to registration with the cellular network 124. If the security management service 106 determines, on the other hand, that the identity data (e.g., the unique identity stored in the universal integrated circuit card 120) associated with the Internet-of-things device 116 is not authorized to register with the cellular network 124; that the corroborating identity information does not match the identity data obtained from the universal integrated circuit card 120 of the Internet-of-things device 116; that the Internet-of-things device 116 is not operating as expected and/or is operating with one or more anomaly; or that malware or unauthorized control of the Internet-of-things device 116 is detected; the Internet-of-things device 116 can be determined not to be entitled to registration with the cellular network 124. It should be understood that this example is illustrative, and therefore should not be construed as being limiting in any way.

If the security management service 106 determines that the Internet-of-things device 116 is not to be registered, the security management service 106 can block or not allow registration of the Internet-of-things device 116 and/or deny provisioning of services on the cellular network 124 to the Internet-of-things device 116. As such, it can be appreciated that in some embodiments, the security management service 106 can take action to prevent registration of the Internet-of-things device 116 on the cellular network 124, while in some other embodiments, the security management service 106 may refrain from taking action to register the Internet-of-things device 116 on the cellular network 124 (without actually taking any action). Because registration of the Internet-of-things device 116 can be blocked or not granted in additional and/or alternative manners, it should be understood that these examples are illustrative, and therefore should not be construed as being limiting in any way. If the security management service 106 determines that the Internet-of-things device 116 is to be registered, the security management service 106 can register the Internet-of-things device 116 on the cellular network 124 and/or allow the Internet-of-things device 116 to register with the cellular network 124. Because the registration with the cellular network 124 can be enabled and/or allowed in additional and/or alternative manners, it should be understood that this example is illustrative, and therefore should not be construed as being limiting in any way.

According to various embodiments, the security management service 106 also can be configured to communicate with one or more resources via the network 104. For example, the security management service 106 can be configured to access one or more third party services 128 that can operate on or in communication with the network 104. The third party services 128 can include, for example, one or more web servers, web sites, file servers, websites, combinations thereof, or the like.

The security management service 106 also can be configured to access network infrastructure 130 associated with the network 104. The network infrastructure 130 can include servers, databases, applications, or the like, operating on and/or in communication with the network 104. Additionally, the security management service 106 also can be configured to access one or more cloud applications 132, which can operate on and/or in communication with the network 104. It can be appreciated that the cloud applications 132 can include one or more applications or services provided by one or more distributed computing devices or environments (e.g., virtual machines, data centers, and/or other processing and/or data storage resources).

It can be appreciated that the cloud applications 132 can be similar to, include, and/or be included in, the third party services 128 and/or network infrastructure 130, in some embodiments. As such, the third party services 128, the network infrastructure 130, and the cloud applications 132 are collectively and/or generically referred to herein at times as "resources" and/or a "resource." Thus, a "resource" as referred to herein can include one or more of the third party services 128, one or more component of the network infrastructure 130, and/or one or more of the cloud applications 132. It should be understood that this example is illustrative, and therefore should not be construed as being limiting in any way.

At some point in time after registering with the cellular network 124, the Internet-of-things device 116 can request access to one of the resources, for example by way of a resource access request 134. The resource access request 134 can correspond to an explicit request to access one of the resources, in some embodiments, and can be generated by the Internet-of-things device 116. In some other embodiments, the resource access request 134 can correspond to an attempt to connect to one of the resources such as, for example, an attempt to access one or more of the third party services 128, an attempt to access one or more component of the network infrastructure 130, and/or an attempt to access and/or call one or more of the cloud applications 132. Thus, it can be appreciated that the resource access request 134 can correspond to an implicit or explicit request to access one or more of the resources.

The security management service 106 can be configured to determine if the access requested by way of the resource access request 134 is to be granted, not granted, allowed, blocked, or the like. In particular, the security management service 106 can analyze (e.g., by executing the credential manager 108) the resource access request 134, the access requested, the identity database 112, the device inventory 114, and/or activity fingerprints (e.g., included in the registration data 126). If the security management service 106 determines that the identity data (e.g., the unique identity stored in the universal integrated circuit card 120) associated with the Internet-of-things device 116 is the same entity that was authorized to register with the cellular network 124; that the corroborating identity information matches the identity data obtained from the universal integrated circuit card 120 of the Internet-of-things device 116; that the Internet-of-things device 116 is operating as expected and without anomalies; and that no malware and/or unauthorized control of the Internet-of-things device 116 is detected; the Internet-of-things device 116 can be determined to be entitled to access the requested resource and/or to obtain the requested access via the cellular network 124.

If the security management service 106 determines that the identity data (e.g., the unique identity stored in the universal integrated circuit card 120) associated with the Internet-of-things device 116 is not authorized to register with the cellular network 124; that the corroborating identity information does not match the identity data obtained from the universal integrated circuit card 120 of the Internet-of-things device 116; that the Internet-of-things device 116 is not operating as expected and/or is operating with one or more anomaly; or that malware or unauthorized control of the Internet-of-things device 116 is detected; the Internet-of-things device 116 can be determined not to be entitled to access the resource via the cellular network 124.

If the security management service 106 approves the access to the resource by the Internet-of-things device 116, the security management service 106 can determine if a certificate 122 is required for the requested access. For example, if the resource being accessed requires a certificate 122 to establish an encrypted and/or verified session with the Internet-of-things device 116, the security management service 106 can determine that a certificate 122 is required. If the security management service 106 determines that the certificate 122 is required, the security management service 106 can provide a copy of the certificate 122 to the resource. For example, as shown in FIG. 1, if the Internet-of-things device 116 is approved to access a cloud application 132, the security management service 106 can be configured to provide, to the cloud application 132, the certificate 122 of the Internet-of-things device 116. It should be understood that this example is illustrative, and therefore should not be construed as being limiting in any way.

Additionally, the security management service 106 can determine, or can invoke the routing controller 110 to determine, for approved access to a resource, a routing to be used for the access to the resource. As used herein, the "routing" for the access can include one or more data paths for a session associated with the requested access. According to various embodiments, the determined routing can include direct communications between the Internet-of-things device 116 and the requested resource (e.g., exchange of data associated with the session, hereinafter referred to as "session data 136") via the cellular network 124 and the network 104. In some other embodiments, the determined routing can include indirect communications between the Internet-of-things device 116 and the requested resource (e.g., exchange of the session data 136 via the server computer 102 (which can manage the communications), the cellular network 124, and the network 104). In some embodiments, the server computer 102 can function as an intermediary to manage security at each communication (e.g., exchange of session data 136) between the Internet-of-things device 116 and the resource. In some other embodiments, direct communication between the Internet-of-things device 116 and the resource without the server computer 102 being an intermediary can reduce latency and/or otherwise improve quality of service. Because a direct or indirect routing can be selected for additional and/or alternative reasons, and because additional and/or alternative benefits can be realized by either approach, it should be understood that the above examples are illustrative and should not be construed as being limiting in any way.

In practice, one or more Internet-of-things devices 116 can include a universal integrated circuit card 120. The universal integrated circuit card 120 can store universally unique and immutable identity data associated with the Internet-of-things device 116, and the Internet-of-things device 116 also can execute a security application 118 for accessing identity data, requesting registration with a cellular network 124, storing and/or providing certificates 122 and/or other functionality. The Internet-of-things device 116 can request registration with the cellular network 124 by sending registration data 126 to a security management service 106, which can be hosted and/or executed by the server computer 102.

The security management service 106 can analyze or trigger analysis of the identity data and/or other data describing behavior of the Internet-of-things device 116 to determine if the Internet-of-things device 116 is to be registered with the cellular network 124. In particular, the security management service 106 can determine, based on behavior of the Internet-of-things device 116, the identity data, identifying information stored in the identity database 112, and information stored in the device inventory 114, if the Internet-of-things device 116 is accurately identified (e.g., that the identity data matches the known identifying information associated with the Internet-of-things device 116), that the Internet-of-things device 116 is operating normally and as expected, and that the Internet-of-things device 116 is not currently under the control of any unauthorized entity and/or malware. If the security management service 106 so determines, the security management service 106 can register and/or trigger registration of the Internet-of-things device 116 with the cellular network 124.

At some time after registering with the cellular network 124, the Internet-of-things device 116 can request access to a resource on the network 104 such as one or more third party services 128, one or more components of network infrastructure 130, and/or one or more cloud applications. The security management service 106 can determine if the access requested by the Internet-of-things device 116 (e.g., by way of an implicit or explicit resource access request 134) is to be granted. In various embodiments, the security management service 106 can again analyze or trigger analysis of the identity data and/or other data describing behavior of the Internet-of-things device 116 to determine if the Internet-of-things device 116 is to be allowed to access the resource as requested via the cellular network 124. The security management service 106 can determine, based on behavior of the Internet-of-things device 116, the identity data, identifying information stored in the identity database 112, and information stored in the device inventory 114, if the Internet-of-things device 116 is accurately identified (e.g., that the identity data matches the known identifying information associated with the Internet-of-things device 116), that the Internet-of-things device 116 is operating normally and as expected, and that the Internet-of-things device 116 is not currently under the control of any unauthorized entity and/or malware. If the security management service 106 so determines, the security management service 106 can allow the requested access to the resource.

If the access is granted, the security management service 106 also can determine (and/or invoke the credential manager 108 to determine) if a certificate 122 is required for communications between the Internet-of-things device 116 and the resource. If the certificate 122 is required for communications between the Internet-of-things device 116 and the resource, the security management service 106 can provide the certificate 122 to the resource. The security management service 106 also can determine (and/or invoke the routing controller 110 to determine) a routing for session data 136 between the Internet-of-things device 116 and the resource. The routing can include a direct session between the Internet-of-things device 116 and the resource or an indirect route between the Internet-of-things device 116 via the server computer 102. These and other aspects of the concepts and technologies disclosed herein for a security management service 106 for Internet-of-things devices 116 will be illustrated and described in additional detail herein.

It can be appreciated that the Internet-of-things device 116 can send the registration data 126 to the server computer 102 via the cellular network 124 prior to registration with the cellular network 124. Namely, the Internet-of-things device 116 can request attachment to the cellular network 124, in some embodiments, by way of sending the registration data 126 to the server computer 102 via a portion of the cellular network 124 (e.g., a tower, or the like), and the registration data 126 can be routed to the server computer 102 to determine if the Internet-of-things device 116 is to be registered with the cellular network 124 to enable the Internet-of-things device 116 to communicate in any other way (e.g., other than requesting access to the cellular network 124) via the cellular network 124. It should be understood that this example is illustrative, and therefore should not be construed as being limiting in any way.

FIG. 1 illustrates one server computer 102, one network 104, multiple Internet-of-things devices 116, one cellular network 124, one instance of third party services 128, one instance of network infrastructure 130, and one instance of cloud applications 132. It should be understood, however, that various implementations of the operating environment 100 can include one or more than one server computer 102; zero, one, or more than one network 104; one or more than one Internet-of-things devices 116; one or more than one cellular network 124; zero, one, or more than one instance of third party services 128; zero, one, or more than one instance of network infrastructure 130; and/or zero, one, or more than one instance of cloud applications 132. As such, the illustrated embodiment should be understood as being illustrative, and should not be construed as being limiting in any way.

Figure 2:
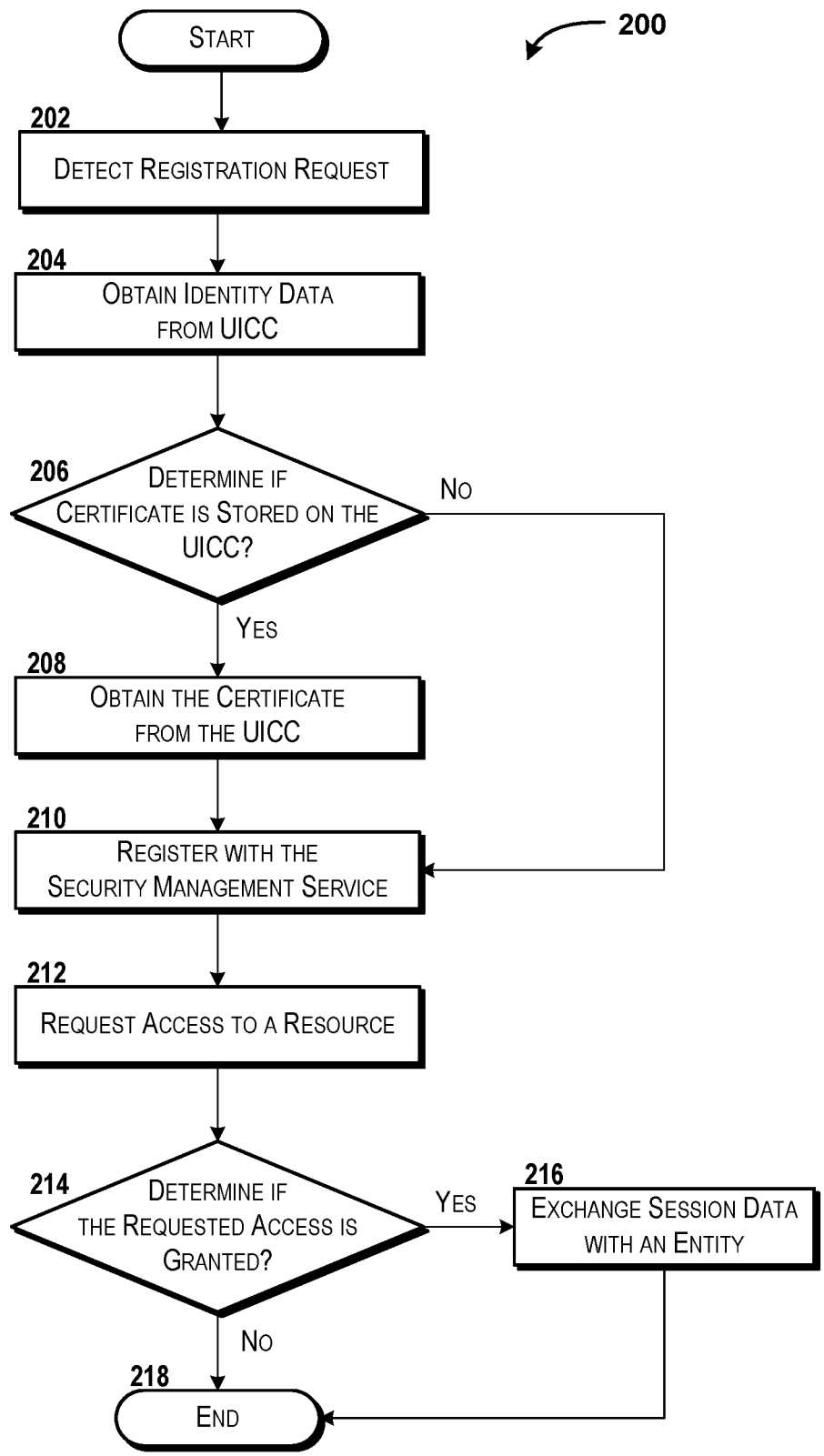
FIG. 2 is a flow diagram showing aspects of a method for an Internet-of-things device registering with a security management service, according to an illustrative embodiment of the concepts and technologies described herein.

Turning now to FIG. 2, aspects of a method 200 for an Internet-of-things device registering with a security management service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 and/or one or more of the Internet-of-things devices 116, to perform one or more operations and/or causing the processor to direct other components of the computing system or device to perform one or more of the operations.

For purposes of illustrating and describing the concepts of the present disclosure, the method 200 is described herein as being performed by the Internet-of-things device 116 via execution of one or more software modules such as, for example, the security application 118 and/or one or more applications that can be implemented on the universal integrated circuit card 120. It should be understood that additional and/or alternative devices and/or network nodes can provide the functionality described herein via execution of one or more modules, applications, and/or other software including, but not limited to, the security application 118. Thus, the illustrated embodiments are illustrative, and should not be viewed as being limiting in any way.

The method 200 begins at operation 202. At operation 202, the Internet-of-things device 116 can detect a registration request. According to various embodiments of the concepts and technologies disclosed herein, the Internet-of-things device 116 can be configured to register with a cellular network 124 when activated (e.g., the first time the Internet-of-things device 116 is turned on, each time the Internet-of-things device 116 is turned on and lacks access to any cellular network 124, etc.), upon receiving a request to register with a cellular network 124 (e.g., via a hardware or software control for registering with the cellular network 124), and/or via other commands. In some embodiments, an Internet-of-things device 116 may be interfaced with by a device such as a gateway, smartphone, or the like, and the request to register the Internet-of-things device 116 with the cellular network 124 may therefore be generated by an application, a user, or the like. Because the request to register the Internet-of-things device 116 with the cellular network 124 can be detected in numerous manners, it should be understood that these examples are illustrative, and therefore should not be construed as being limiting in any way.

From operation 202, the method 200 can proceed to operation 204. At operation 204, the Internet-of-things device 116 can obtain identity data from the universal integrated circuit card 120. According to various embodiments of the concepts and technologies disclosed herein, the universal integrated circuit card 120 of the Internet-of-things device 116 can store identity information that can uniquely identify the Internet-of-things device 116. As can be appreciated, a unique identifier such as a universal integrated circuit card 120 of the Internet-of-things device 116 can enable device-level control of access to ensure that only authorized Internet-of-things devices 116 are allowed to attach to the cellular network 124 and/or other entities via the cellular network 124. Other attempts to identify Internet-of-things devices 116 (e.g., IP addresses, or the like) are easily replicated and/or cloned, while a unique identifier such as an identity associated with a universal integrated circuit card 120 can be known by the cellular network 124 (and/or entities thereon and/or associated therewith such as the server computer 102). It should be understood that this example is illustrative, and therefore should not be construed as being limiting in any way.

From operation 204, the method 200 can proceed to operation 206. At operation 206, the Internet-of-things device 116 can determine if a certificate 122 is stored in the universal integrated circuit card 120. According to various embodiments of the concepts and technologies disclosed herein, the universal integrated circuit card 120 can be configured to store a certificate 122. In some embodiments, the certificate 122 can be generated and stored in the universal integrated circuit card 120 when the universal integrated circuit card 120 is created, while in other embodiments, the certificate 122 can be obtained (e.g., via issuance by a certificate authority) and loaded to the universal integrated circuit card 120 by an authorized entity (e.g., an owner of the Internet-of-things device 116, a gateway, or the like). Because the certificate 122 can be loaded to the universal integrated circuit card 120 in additional and/or alternative ways, it should be understood that these examples are illustrative, and therefore should not be construed as being limiting in any way.

If the Internet-of-things device 116 determines, in operation 206, that a certificate 122 is stored in the universal integrated circuit card 120, the method 200 can proceed to operation 208. At operation 208, the Internet-of-things device 116 can obtain the certificate 122 from the universal integrated circuit card 120. According to various embodiments of the concepts and technologies disclosed herein, the Internet-of-things device 116 can retrieve the certificate 122 from the universal integrated circuit card 120 wherein the universal integrated circuit card 120 can function as a data storage device for the certificate 122.

In some embodiments, the certificate 122 is stored in a secure memory that can be integrated into the universal integrated circuit card 120. In some embodiments, the secure memory of the universal integrated circuit card 120 can be created when the universal integrated circuit card 120 is manufactured and/or loaded (e.g., "flashed") by an authorized entity. As such, it can be appreciated that the certificate 122 can be encrypted and/or otherwise stored in a manner that is configured to allow only the Internet-of-things device 116 to retrieve and use the certificate 122 from the universal integrated circuit card 120. It should be understood that this example is illustrative, and therefore should not be construed as being limiting in any way.

From operation 208, the method 200 can proceed to operation 210. The method 200 also can proceed to operation 210 if the Internet-of-things device 116 determines, in operation 206, that a certificate 122 is not stored in the universal integrated circuit card 120. At operation 210, the Internet-of-things device 116 can register with a security management service 106. According to various embodiments, the Internet-of-things device 116 can provide, to the server computer 102 or other device that hosts and/or executes the security management service 106, registration data 126.

The registration data 126 can include the identity data obtained from the universal integrated circuit card 120 and, if included, the certificate 122 retrieved from the universal integrated circuit card 120. The registration data 126 also can include other data as illustrated and described herein such as contextual information that indicates how the Internet-of-things device 116 is being used, geolocation data that identifies a geographic location of the Internet-of-things device 116, and/or other information. These and/or other data can be provided to the server computer 102 as a file or other data structure generated by the Internet-of-things device 116.

The security management service 106 can analyze the registration data 126 and, if appropriate, register the Internet-of-things device 116 for communications via the cellular network 124. Thus, operation 210 can correspond to the Internet-of-things device 116 requesting provisioning of cellular network connectivity and the cellular network 124 granting cellular network connectivity. It should be understood that this example is illustrative, and therefore should not be construed as being limiting in any way.

From operation 210, the method 200 can proceed to operation 212. At operation 212, the Internet-of-things device 116 can request access to a resource such as the third party services 128, the network infrastructure 130, and/or the cloud applications 132. It can be appreciated that the functionality of operation 212 can be performed at any time after registering with the cellular network 124 and is not necessarily immediately after registration.

At any rate, in operation 212, the Internet-of-things device 116 can request connection to one or more resources and/or the use of one or more resources. In some embodiments, for example, the Internet-of-things device 116 can request access to another network 104 and/or network infrastructure 130 associated therewith for various reasons; access to third party services 128; and/or access to one or more cloud applications 132. As such, operation 212 can correspond to the Internet-of-things device 116 attempting to access one or more resource and/or the Internet-of-things device 116 requesting access to the one or more resource. It should be understood that these examples are illustrative, and therefore should not be construed as being limiting in any way.

From operation 212, the method 200 can proceed to operation 214. At operation 214, the Internet-of-things device 116 can determine if the access requested in operation 212 has been granted by the security management service 106. According to various embodiments of the concepts and technologies disclosed herein, the security management service 106 can determine if the Internet-of-things device 116 is to be allowed to access the requested resource, as will be explained in more detail herein, particularly with reference to FIG. 4, and grant or deny the access.

If the Internet-of-things device 116 determines, in operation 214, that the requested access has been granted, the Internet-of-things device 116 can exchange session data 136 with an entity. In particular, the Internet-of-things device 116 can be configured to communicate via the server computer 102. In some embodiments, the server computer 102 can be configured (e.g., by execution of the security management service 106) to send and receive the session data 136 as an intermediary and/or trusted entity for the Internet-of-things device 116 and/or the resources, thereby enhancing security of the communications. In some other embodiments, the server computer 102 can be configured (e.g., by execution of the security management service 106) to enable communications directly between the Internet-of-things device 116 and the resource via direct exchange of session data 136 between the Internet-of-things device 116 and the resource. Thus, operation 214 can correspond to the server computer 102 enabling communications between the Internet-of-things device 116 and the resource (e.g., by either acting as an intermediary for the session data 136 or by allowing the devices to connect to one another). It should be understood that this example is illustrative, and therefore should not be construed as being limiting in any way.

If the Internet-of-things device 116 determines, in operation 214, that the requested access has not been granted, method 200 can proceed to operation 218. The method 200 also can proceed to operation 218 after the Internet-of-things device 116 exchanges session data 136 with the entity as illustrated in operation 216. The method 200 can end at operation 218.

Figure 3:
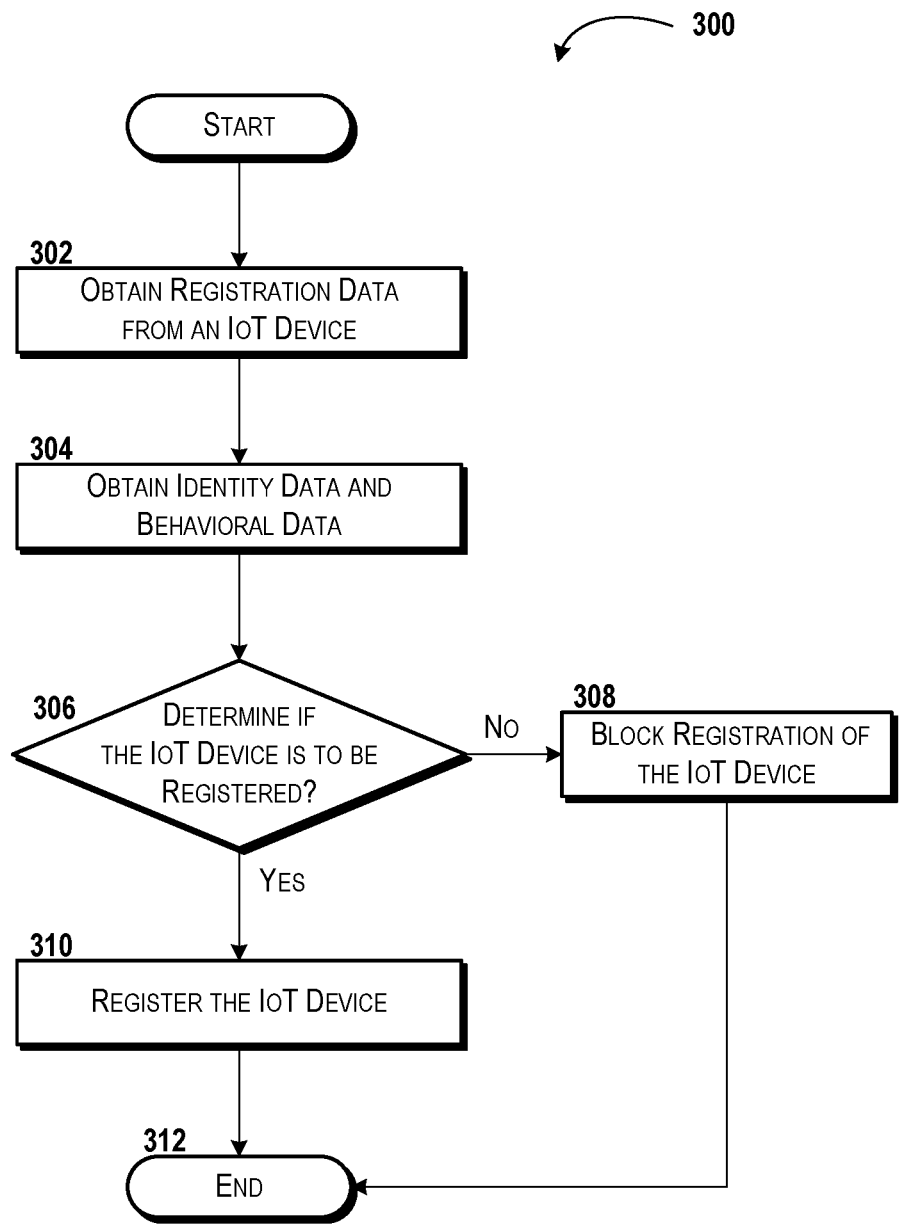
FIG. 3 is a flow diagram showing aspects of a method for registering an Internet-of-things device with a security management service, according to an illustrative embodiment of the concepts and technologies described herein.

Turning now to FIG. 3, aspects of a method 300 for registering an Internet-of-things device with a security management service will be described in detail, according to an illustrative embodiment. For purposes of illustrating and describing the concepts of the present disclosure, the method 300 is described herein as being performed by the server computer 102 via execution of one or more software modules such as, for example, the security management service 106. It should be understood that additional and/or alternative devices and/or network nodes can provide the functionality described herein via execution of one or more modules, applications, and/or other software including, but not limited to, the security management service 106. Thus, the illustrated embodiments are illustrative, and should not be viewed as being limiting in any way.

The method 300 begins at operation 302. At operation 302, the server computer 102 can obtain registration data 126 from an Internet-of-things device 116. As noted above, the registration data 126 can include identity data, a certificate 122, other data (if included), and/or other information. In various embodiments of the concepts and technologies disclosed herein, the registration data 126 includes at least the identity data, wherein the identity data includes a unique identifier for the Internet-of-things device 116 (e.g., a unique identifier generated by the universal integrated circuit card 120). In some other embodiments, the registration data 126 also can include a certificate 122 associated with the Internet-of-things device 116. In yet other embodiments, the registration data 126 can include other information such as geolocation data, contextual data, or the like. Thus, operation 302 can include the server computer 102 obtaining at least a unique identifier associated with the Internet-of-things device 116. It should be understood that this example is illustrative, and therefore should not be construed as being limiting in any way.

From operation 302, the method 300 can proceed to operation 304. At operation 304, the server computer 102 can obtain data associated with the Internet-of-things device 116. In some embodiments, for example, the server computer 102 can obtain inventory data associated with the Internet-of-things device 116, identity data associated with the Internet-of-things device 116, anomaly detection data associated with the Internet-of-things device 116, threat intelligence data associated with the Internet-of-things device 116, and/or other data.

In some embodiments, operation 304 can include the server computer 102 obtaining inventory data from the device inventory 114. Operation 304 also can include the server computer 102 obtaining the identity data from the identity database 112. Operation 304 also can include the server computer 102 determining, based on anomaly detection and/or threat intelligence, if the Internet-of-things device 116 is healthy (e.g., not infected by malware and/or operating normally) or unhealthy and should or should not be registered with the cellular network 124. It should be understood that this example is illustrative, and therefore should not be construed as being limiting in any way.

According to various embodiments, the device inventory 114 can correspond to a subscriber database that can link one or more universal integrated circuit cards (e.g., the universal integrated circuit card 120) to one or more device details (e.g., manufacturer, model, serial number, etc.) and/or customer information associated with the Internet-of-things device 116 (e.g., a user or username associated with the Internet-of-things device 116). Thus, the device inventory 114 can identify the Internet-of-things device 116 and/or one or more users associated with the Internet-of-things device 116. It should be understood that this example is illustrative, and therefore should not be construed as being limiting in any way.

In various embodiments, the identity database 112 can include various other types of information and/or data that can identify the Internet-of-things device 116 (in addition to the identity data obtained from the universal integrated circuit card 120) and can be used to correlate and/or corroborate the identity data. Thus, for example, the identity database 112 can store one or more IP addresses (e.g., a IPv4 address, an IPv6 address, etc.) for the Internet-of-things device 116, a media access control ("MAC") address for the Internet-of-things device 116, access point names ("APNs") and/or data network names ("DNNs"), location area codes ("LACs") and/or tracking area codes ("TACs"), other identifying information, combinations thereof, or the like. These and/or other network attributes can be correlated to the Internet-of-things device 116 and used as one or more factors when authenticating (or not authenticating) the Internet-of-things device 116. Thus, operation 304 can correspond to the server computer 102 obtaining these and/or other data for use in determining if the Internet-of-things device 116 is to be registered with the cellular network 124. Because other information can be used to determine if the Internet-of-things device 116 is to be registered with the cellular network 124, it should be understood that these examples are illustrative, and therefore should not be construed as being limiting in any way.

According to some embodiments, the anomaly detection (e.g., an anomaly detection module or process of the security management service 106) can be configured to monitor and build a baseline for various Internet-of-things devices 116 (e.g., to establish "normal" behavior and "abnormal" behavior for Internet-of-things devices 116 when connected to the cellular network 124. According to various embodiments, these baselines are determined using machine learning ("ML") and/or artificial intelligence ("AI") to analyze activity of Internet-of-things devices 116 that are known to be healthy and/or operating normally. With this baseline, activity and/or contextual data associated with Internet-of-things devices 116 can be analyzed to determine if the Internet-of-things devices 116 are healthy and/or operating normally. For example, the baseline can be correlated to activity and/or artefacts (e.g., the certificates 122, keys, tokens, multi-factor authentication ("MFA") attributes, etc.) to evaluate any Internet-of-things device 116 (for which a baseline exists) to determine if the Internet-of-things device 116 is operating normally and/or as expected. This correlation can be performed as part of operation 304, in some embodiments.

According to some embodiments, threat intelligence (e.g., a threat intelligence module or process of the security management service 106) can be configured to analyze the Internet-of-things device 116 to detect any malware signatures and/or other activity that indicates that the Internet-of-things device 116 is infected and/or under the control of malware and/or other unauthorized entities. Thus, operation 304 can also include scanning the Internet-of-things device 116 behavior and/or communications to identify any infections of the Internet-of-things device 116. It should be understood that this example is illustrative, and therefore should not be construed as being limiting in any way.

From operation 304, the method 300 can proceed to operation 306. At operation 306, the server computer 102 can determine if the Internet-of-things device 116 is to be registered. Operation 306 can include considering the data and/or analysis obtained in operation 304 to determine if the Internet-of-things device 116 is to be registered with the cellular network 124. Thus, it can be appreciated that operation 306 can include analyzing the device inventory 114 and/or identity database 112 to determine if the identity associated with the Internet-of-things device 116 is authorized to register with the cellular network 124. Operation 306 also can include the server computer 102 determining, based on the anomaly detection, if the Internet-of-things device 116 is operating normally and/or as expected. Operation 306 also can include the server computer 102 determining, based on the threat intelligence, if the Internet-of-things device 116 is infected and/or otherwise under the control of any unauthorized entity or process.

According to various embodiments of the concepts and technologies disclosed herein, if the server computer 102 determines that the identity data (e.g., the unique identity stored in the universal integrated circuit card 120) associated with the Internet-of-things device 116 is authorized to register with the cellular network 124; that the corroborating identity information matches the identity data obtained from the universal integrated circuit card 120 of the Internet-of-things device 116; that the Internet-of-things device 116 is operating as expected and without anomalies; and that no malware and/or unauthorized control of the Internet-of-things device 116 is detected; the Internet-of-things device 116 can be determined to be entitled to registration with the cellular network 124.

Conversely, according to various embodiments of the concepts and technologies disclosed herein, if the server computer 102 determines that the identity data (e.g., the unique identity stored in the universal integrated circuit card 120) associated with the Internet-of-things device 116 is not authorized to register with the cellular network 124; that the corroborating identity information does not match the identity data obtained from the universal integrated circuit card 120 of the Internet-of-things device 116; that the Internet-of-things device 116 is not operating as expected and/or is operating with one or more anomaly; or that malware or unauthorized control of the Internet-of-things device 116 is detected; the Internet-of-things device 116 can be determined not to be entitled to registration with the cellular network 124. It should be understood that this example is illustrative, and therefore should not be construed as being limiting in any way.

If the server computer 102 determines, in operation 306, that the Internet-of-things device 116 is not to be registered, the method 300 can proceed to operation 308. At operation 308, the server computer 102 can block registration of the Internet-of-things device 116 and/or deny provisioning of services on the cellular network 124 to the Internet-of-things device 116. As such, it can be appreciated that in some embodiments, the server computer 102 can take action to prevent registration of the Internet-of-things device 116 on the cellular network 124, while in some other embodiments, the server computer 102 may refrain from taking action to register the Internet-of-things device 116 on the cellular network 124 (without actually taking any action). Because registration of the Internet-of-things device 116 can be blocked or not granted in additional and/or alternative manners, it should be understood that these examples are illustrative, and therefore should not be construed as being limiting in any way.

If the server computer 102 determines, in operation 306, that the Internet-of-things device 116 is to be registered, the method 300 can proceed to operation 310. At operation 310, the server computer 102 can register the Internet-of-things device 116 on the cellular network 124. According to various embodiments of the concepts and technologies disclosed herein, the server computer 102 can provision the Internet-of-things device 116 on the cellular network 124 and/or trigger provisioning of service to the Internet-of-things device 116 on the cellular network 124. Thus, operation 310 can correspond to the cellular network 124 enabling one or more connections between one or more devices of the cellular network 124 (e.g., a tower, or the like) and the Internet-of-things device 116 to enable the Internet-of-things device 116 to access the network 104 via the cellular network 124. It should be understood that this example is illustrative, and therefore should not be construed as being limiting in any way.

From operation 310, the method 300 can proceed to operation 312. The method 300 can end at operation 312.

Figure 4:
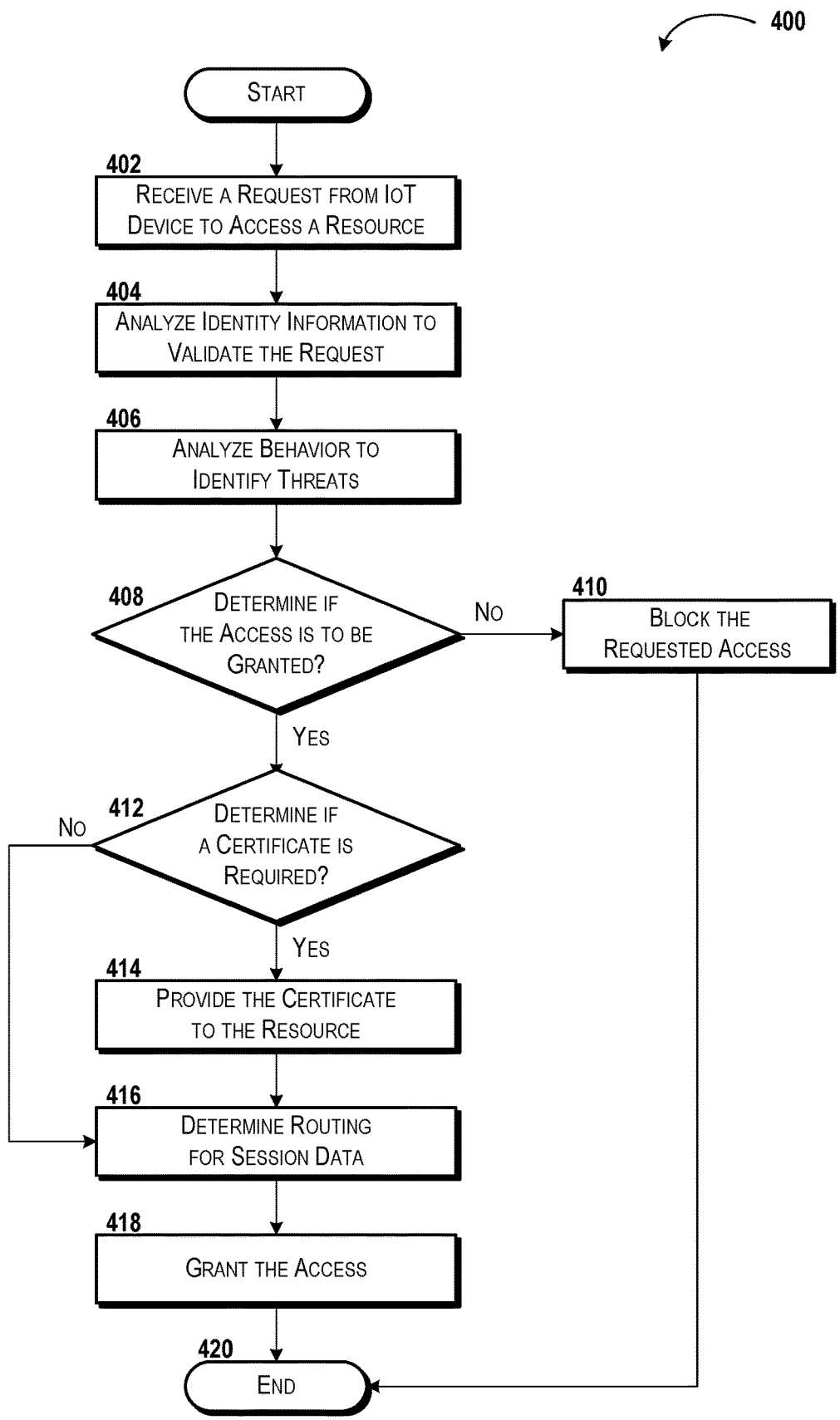
FIG. 4 is a flow diagram showing aspects of a method for evaluating a resource access request from an Internet-of-things device using a security management service, according to an illustrative embodiment of the concepts and technologies described herein.

Turning now to FIG. 4, aspects of a method 400 for evaluating a resource access request from an Internet-of-things device 116 using a security management service will be described in detail, according to an illustrative embodiment. For purposes of illustrating and describing the concepts of the present disclosure, the method 400 is described herein as being performed by the server computer 102 via execution of one or more software modules such as, for example, the security management service 106. It should be understood that additional and/or alternative devices and/or network nodes can provide the functionality described herein via execution of one or more modules, applications, and/or other software including, but not limited to, the security management service 106. Thus, the illustrated embodiments are illustrative, and should not be viewed as being limiting in any way.

The method 400 begins at operation 402. At operation 402, the server computer 102 can receive or detect a request (e.g., the resource access request 134) from an Internet-of-things device 116. It can be appreciated that the resource access request 134 received in operation 402 can be sent by the Internet-of-things device 116 via the cellular network 124 and received by the server computer 102 via the cellular network 124. Of course, it must be appreciated that the server computer 102 may not have cellular connectivity in various embodiments, and therefore other networks may be involved in transfer of the resource access request 134 from the Internet-of-things device 116 to the server computer 102. In various embodiments of operation 402, however, the resource access request 134 is transmitted from the Internet-of-things device 116 to the server computer 102 via the cellular network 124. It should be understood that this example is illustrative, and therefore should not be construed as being limiting in any way.

The resource access request 134 received in operation 402 can specify a resource to which the Internet-of-things device 116 is requesting access. The resource access request 134 can include, in some embodiments, an implicit request. For example, the Internet-of-things device 116 may generate a request to access a particular resource such as a website, a file, an application or the like provided by the third party services 128, the network infrastructure 130, and/or the cloud applications 132 in some embodiments. In some other embodiments, the resource access request 134 obtained in operation 402 can include an explicit request that requests access to the resource such as a website, a file, an application or the like provided by the third party services 128, the network infrastructure 130, and/or the cloud applications 132. Thus, operation 402 can include an explicit request generated by the Internet-of-things device 116 in some embodiments, or an implicitly-determined request for access to a resource. Because the request to access a resource can be detected or inferred in various manners, it should be understood that these examples are illustrative, and therefore should not be construed as being limiting in any way.

From operation 402, the method 400 can proceed to operation 404. At operation 404, the server computer 102 can analyze identity information to validate the request received or detected in operation 402. Thus, operation 404 can correspond to the server computer 102 determining the identity of the Internet-of-things device 116 (e.g., via the universal integrated circuit card 120) and comparing that to other obtained identifying information (e.g., IP addresses, MAC addresses, etc.) to determine if the request obtained in operation 404 was received from the Internet-of-things device 116 (and not any other device spoofing and/or attempting to emulate the Internet-of-things device 116). It should be understood that this example is illustrative, and therefore should not be construed as being limiting in any way.

Operation 404 therefore can correspond to the server computer 102 accessing the device inventory 114, the identity database 112, and/or other information to confirm the identity of the Internet-of-things device 116. Thus, operation 404 can correspond to a continuing analysis of identity associated with the Internet-of-things device 116 to ensure that the Internet-of-things device 116 is still the same device that was authorized for registration with the cellular network 124 previously. It should be understood that this example is illustrative, and therefore should not be construed as being limiting in any way.

It can be appreciated that the functionality of operation 404 can be similar, in some embodiments, to the analysis performed by the server computer 102 when determining if the Internet-of-things device 116 should be registered with the cellular network 124, but in operation 404 the analysis can be performed on the specific resource access request 134 received or detected in operation 402 as opposed to being performed on the Internet-of-things device 116 in general. It should be understood that this example is illustrative, and therefore should not be construed as being limiting in any way.

From operation 404, the method 400 can proceed to operation 406. At operation 406, the server computer 102 can analyze behavior of the Internet-of-things device 116 to identify any threats associated with the access requested in operation 402. Thus, operation 406 can correspond to the server computer 102 performing a threat evaluation for the Internet-of-things device 116 and/or the access requested by way of the resource access request 134. In operation 406, the server computer 102 can analyze the requested access to detect malware signatures, unauthorized access, behavior anomalies, and the like. Thus, if the access or resource requested by way of the resource access request 134 received or detected in operation 402 is not consistent with the Internet-of-things device 116 baseline as determined by the security management service 106, the server computer 102 can detect such a deviation via the analysis in operation 406. It should be understood that this example is illustrative, and therefore should not be construed as being limiting in any way.

Operation 404 can correspond to the server computer 102 performing anomaly detection and/or threat detection on the resource access request 134. Thus, operation 404 can correspond to a continuing analysis of activity associated with the Internet-of-things device 116 to ensure that the Internet-of-things device 116 is still operating normally and not suspect of being under the control of malware and/or any other unauthorized entity or process, in some embodiments.

It can be appreciated that the functionality of operation 406 can be similar, in some embodiments, to the analysis performed by the server computer 102 when determining if the Internet-of-things device 116 should be registered with the cellular network 124, but in operation 406, the analysis can be performed on the specific resource access request 134 received or detected in operation 402 and/or associated behavior of the Internet-of-things device 116 as opposed to being performed on the Internet-of-things device 116 in general. It should be understood that this example is illustrative, and therefore should not be construed as being limiting in any way.

From operation 406, the method 400 can proceed to operation 408. At operation 408, the server computer 102 can determine if the access requested by way of the resource access request 134 is to be granted. According to various embodiments of the concepts and technologies disclosed herein, the server computer 102 can again obtain and analyze behavioral data (e.g., contextual data) associated with the Internet-of-things device 116, identity data associated with the Internet-of-things device 116, data from the identity database 112, data from the device inventory 114, and/or other information to determine if the Internet-of-things device 116 is to be allowed to access the resource as requested.

According to various embodiments of the concepts and technologies disclosed herein, if the server computer 102 determines that the identity data (e.g., the unique identity stored in the universal integrated circuit card 120) associated with the Internet-of-things device 116 is not the same identity that was authorized to register with the cellular network 124 and/or that the Internet-of-things device 116 is not authorized to access the resource as requested in operation 402 via the cellular network 124; that the corroborating identity information does not match the identity data obtained from the universal integrated circuit card 120 of the Internet-of-things device 116; that the Internet-of-things device 116 is not operating as expected and/or is operating with one or more anomaly; or that malware or unauthorized control of the Internet-of-things device 116 is detected; the Internet-of-things device 116 can be determined not to be entitled to access the resource via the cellular network 124, and the method 400 can proceed to operation 410. At operation 410, the server computer 102 can block access to the resource requested by way of the resource access request 134. It should be understood that this example is illustrative, and therefore should not be construed as being limiting in any way.

If the server computer 102 determines, in operation 408, that the identity data (e.g., the unique identity stored in the universal integrated circuit card 120) associated with the Internet-of-things device 116 is the same entity that was authorized to register with the cellular network 124 and/or that the Internet-of-things device 116 is authorized to access the resource as requested in operation 402 via the cellular network 124; that the corroborating identity information matches the identity data obtained from the universal integrated circuit card 120 of the Internet-of-things device 116; that the Internet-of-things device 116 is operating as expected and without anomalies; and that no malware and/or unauthorized control of the Internet-of-things device 116 is detected; the Internet-of-things device 116 can be determined to be entitled to access the requested resource and/or to obtain the requested access via the cellular network 124, and the method 400 can proceed to operation 412.

At operation 412, the server computer 102 can determine if a certificate 122 is required for the access requested by way of the request received or detected in operation 402. In operation 412, the server computer 102 can determine, for example, if the resource to which access is being requested requires a certificate 122 for communications and/or if the resource has requested a certificate 122. For example, some cloud applications 132 may require the certificate 122 to begin a session with the Internet-of-things device 116 in some embodiments. It should be understood that this example is illustrative, and therefore should not be construed as being limiting in any way.

If the server computer 102 determines, in operation 412, that the access requested by way of the resource access request 134 requires a certificate 122, the method 400 can proceed to operation 414. At operation 414, the server computer 102 can provide the certificate 122 to the resource. As explained above, the server computer 102 can store certificates 122 for multiple Internet-of-things devices 116 in some embodiments. For example, in some embodiments the server computer 102 can store one or more certificate 122 for one or more Internet-of-things device 116 in the device inventory 114. It should be understood that this example is illustrative, and therefore should not be construed as being limiting in any way.

In some other embodiments, the server computer 102 can be configured to obtain certificates 122 from the Internet-of-things device 116 with the resource access request 134, on-demand or by request, and/or at other times. Thus, the server computer 102 can store and/or can obtain the certificate 122 in operation 414 and provide the certificate 122 to the resource. It should be understood that this example is illustrative, and therefore should not be construed as being limiting in any way.

From operation 414, the method 400 can proceed to operation 416. The method 400 also can proceed to operation 416 if the server computer 102 determines, in operation 412, that the access requested by way of the resource access request 134 does not require a certificate 122. At operation 416, the server computer 102 can determine routing for session data 136 associated with accessing the resource as requested by way of the resource access request 134.

In operation 416, the server computer 102 can determine whether the Internet-of-things device 116 should be enabled to communicate directly with the resource (e.g., by exchanging session data 136 with the resource directly via the cellular network 124 and the network 104), or if the session data 136 is to be routed through the server computer 102 during the session (e.g., the server computer 102 will communicate directly with the resource via the network 104 to exchange session data 136 with the resource, and will communicate with the Internet-of-things device 116 via the cellular network 124 to exchange the session data 136 with the Internet-of-things device 116).

Thus, it can be appreciated that in some embodiments, the server computer 102 can be configured to set up connections between the Internet-of-things device 116 and the resource (e.g., build a connection that has the Internet-of-things device 116 as a first endpoint, the resource as the second endpoint, and the cellular network 124 and the network 104 as enabling connections), while in some other embodiments, the server computer 102 can function as an intermediary for the Internet-of-things device 116 and the resource.

In some embodiments, the server computer 102 can opt for routing session data 136 through the server computer 102 to enhance security of the security management service 106 (e.g., by performing deep packet inspection ("DPI") on the session data 136, by metering the traffic to prevent overflow attacks, man-in-the-middle ("MITM") attacks, or the like) and/or for other reasons (e.g., load balancing or the like). In some other embodiments, the server computer 102 can opt to enable direct communications between the Internet-of-things device 116 and the resource via the cellular network 124 and the network 104 to provide lower latency and/or higher quality of service ("QoS") than may be possible if the server computer 102 manages exchange of the session data 136. Because the routing of the session data 136 can be determined in additional and/or alternative manners, and because the choice of routing can be based on additional and/or alternative considerations, it should be understood that these examples are illustrative, and therefore should not be construed as being limiting in any way.

From operation 416, the method 400 can proceed to operation 418. At operation 418, the server computer 102 can grant the access to the resource as requested by way of the resource access request 134. It can be appreciated that the access granted in operation 418 can be granted in accordance with the routing determined in operation 416. Thus, the server computer 102 can grant, in operation 418, direct access to the resource and/or access directed through the server computer 102. It should be understood that these examples are illustrative, and therefore should not be construed as being limiting in any way.

From operation 418, the method 400 can proceed to operation 420. The method 400 can also proceed to operation 420 from operation 410. The method 400 can end at operation 420.

Figure 5:
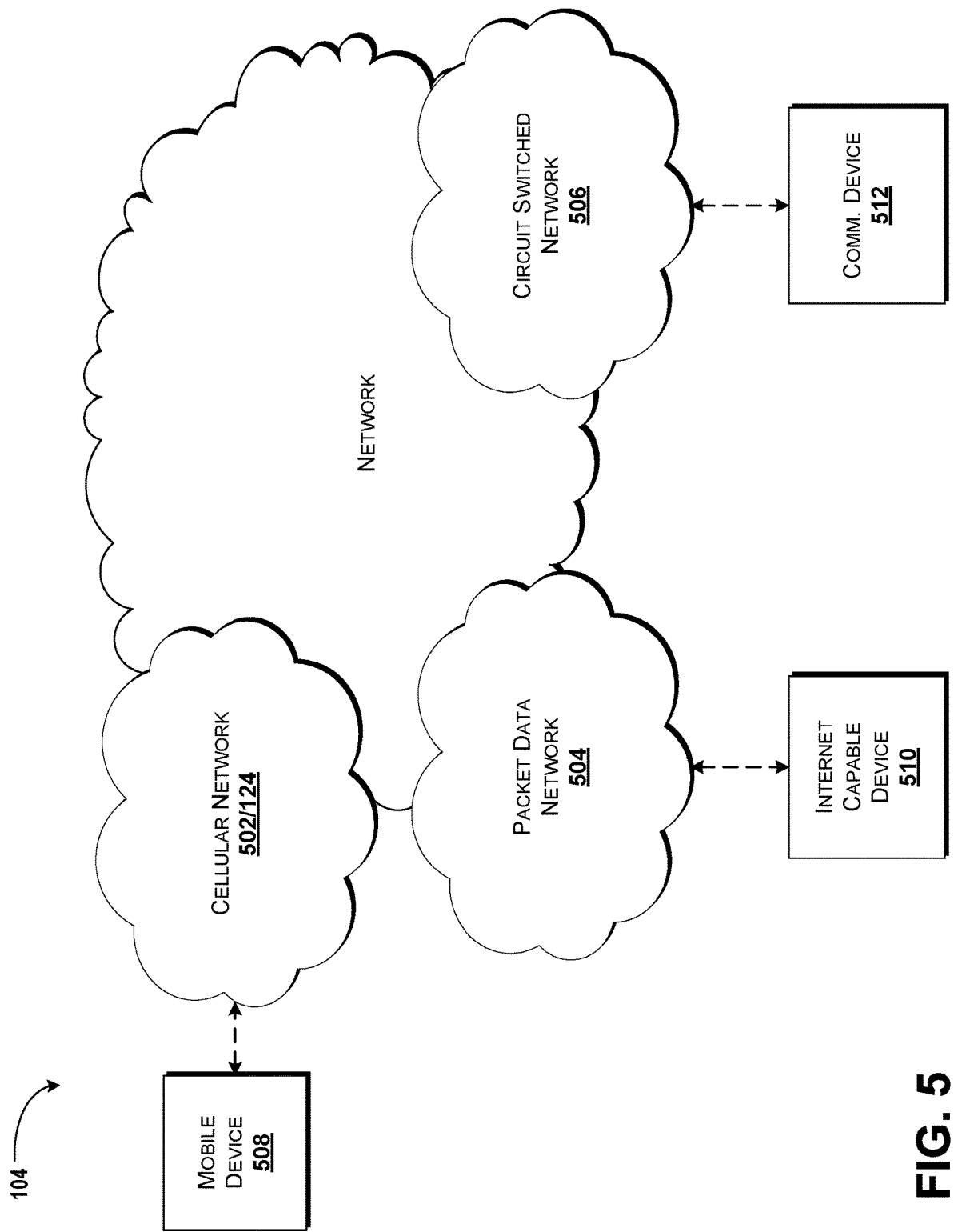
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502 (for example, the cellular network 124 illustrated and described hereinabove), a packet data network 504, for example, the Internet, and a circuit switched network 506, for example, a publicly switched telephone network ("PSTN"). The cellular network 502 (and/or the cellular network 124) includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 (and/or the cellular network 124) also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502 (and/or the cellular network 124). The cellular network 502 (and/or the cellular network 124) can be configured as a 2G GSM network and can provide data communications via GPRS and/or EDGE. Additionally, or alternatively, the cellular network 502 (and/or the cellular network 124) can be configured as a 3G UMTS network and can provide data communications via the HSPA protocol family, for example, HSDPA, EUL (also referred to as HSUPA), and HSPA+. The cellular network 502 (and/or the cellular network 124) also is compatible with 4G mobile communications standards, 5G mobile communications standards, other mobile communications standards, and evolved and future mobile communications standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 (and/or the cellular network 124) is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502 (and/or the cellular network 124), and devices connected thereto, through the packet data network 504. It also should be appreciated that the Internet-capable device 510 can communicate with the packet data network 504 through the circuit switched network 506, the cellular network 502 (and/or the cellular network 124), and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502 (and/or the cellular network 124). It should be appreciated that the communications device 512 can be an Internet-capable device, and can be substantially similar to the Internet-capable device 510. In the specification, the network 104 is used to refer broadly to any combination of the networks 502, 504, 506 (and/or the cellular network 124). It should be appreciated that substantially all of the functionality described with reference to the network 104 can be performed by the cellular network 502 (and/or the cellular network 124), the packet data network 504, and/or the circuit switched network 506, alone or in combination with other networks, network elements, and the like.

Figure 6:
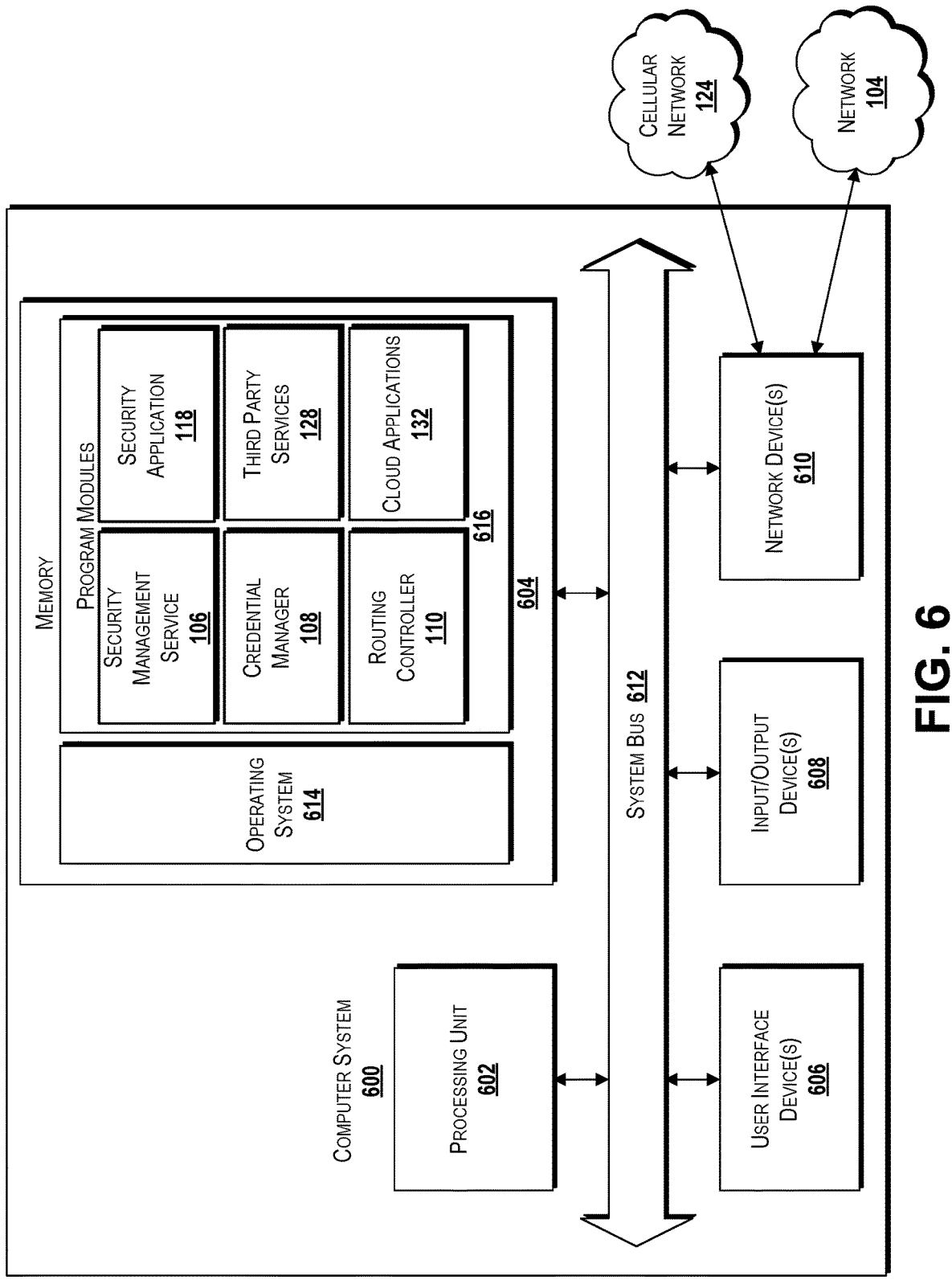
FIG. 6 is a block diagram illustrating an example computer system configured to implement various aspects of the concepts and technologies disclosed herein, according to some illustrative embodiments of the concepts and technologies described herein.

FIG. 6 is a block diagram illustrating a computer system 600 configured to provide the functionality described herein for providing and using a security management service for Internet-of-things devices, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the security management service 106, the credential manager 108, the routing controller 110, the security application 118, the third party services 128, the cloud applications 132, and/or one or more components of the network infrastructure 130. These and/or other programs can be embodied in computer-readable media containing instructions that, when executed by the processing unit 602, perform one or more of the methods 200, 300, and 400 described in detail above with respect to FIGS. 2-4 and/or other functionality as illustrated and described herein. It can be appreciated that, at least by virtue of the instructions embodying the methods 200, 300, and 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the identity database 112, the device inventory 114, the universal integrated circuit card 120, the certificate 122, the registration data 126, the resource access request 134, the session data 136, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104 and/or the cellular network 124. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
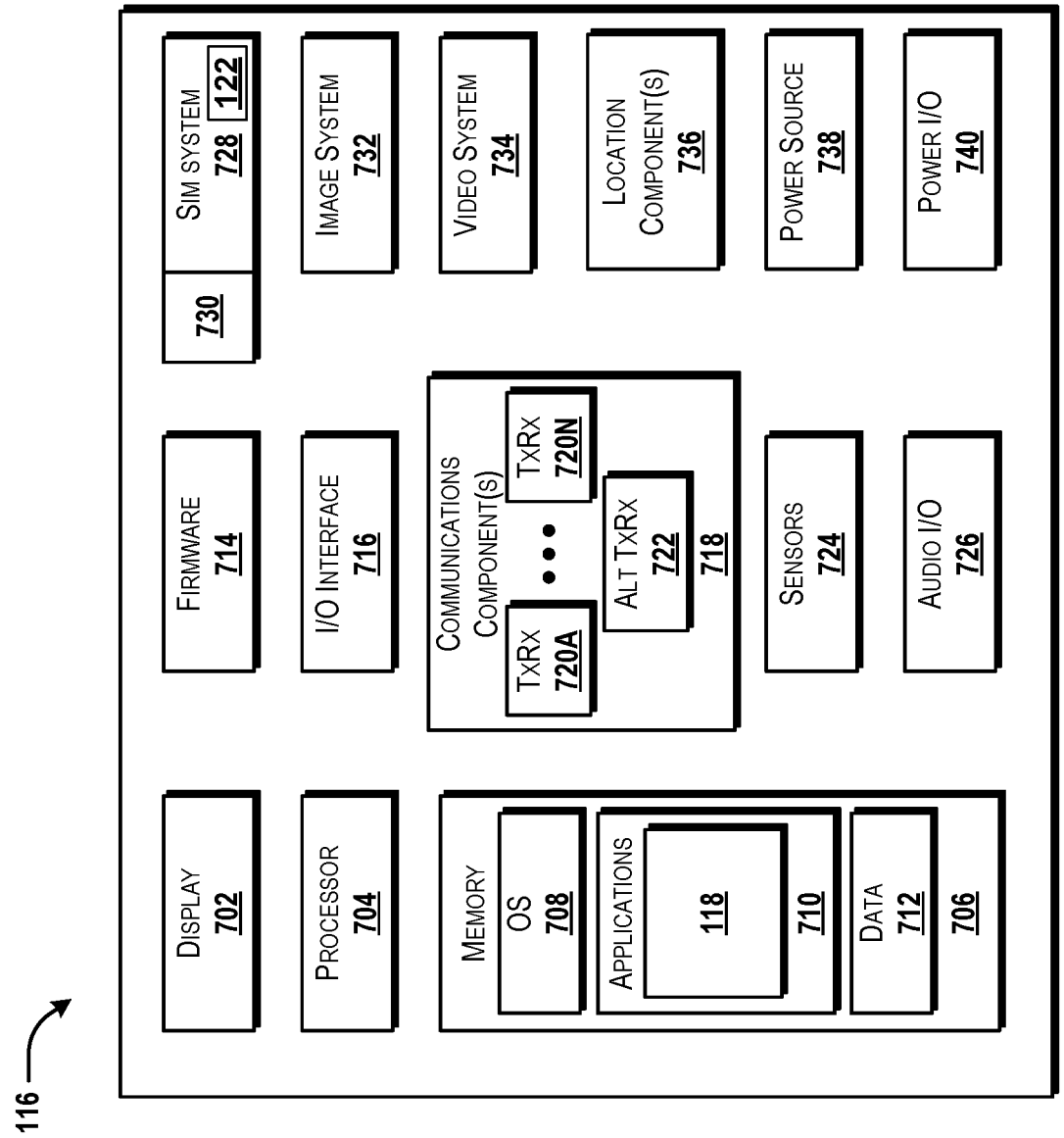
FIG. 7 is a block diagram illustrating an example Internet-of-things device configured to interact with a security management service, according to some illustrative embodiments of the concepts and technologies described herein.

Turning now to FIG. 7, an illustrative Internet-of-things device 116 and components thereof will be described. It should be understood that not all embodiments of the Internet-of-things device 116 include all of the components and/or functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the Internet-of-things device 116 can include a display 702 for displaying various types of information and/or data. According to various embodiments, the display 702 can be configured to display various graphical user interface ("GUI") elements such as, for example, connection information, identity information, text, images, video, virtual keypads and/or keyboards, messaging data, notification messages, metadata, internet content, device status, time, date, calendar data, device preferences, map and location data, combinations thereof, and/or the like. The Internet-of-things device 116 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the security application 118 and/or other computer-executable instructions stored in a memory 706, or the like.

In some embodiments, the applications 710 also can include a UI application (not illustrated in FIG. 7). If included, the UI application can interface with the operating system 708 to facilitate user interaction with functionality and/or data stored at the Internet-of-things device 116 and/or stored elsewhere. In some embodiments, the operating system 708 can include various members of various families of operating systems, as is generally understood. The UI application can be executed by the processor 704 to aid a user in entering content, identity information, storing certificates 122, managing authentication information, configuring settings, interacting with other applications 710, and otherwise facilitating user interaction with the operating system 708, the applications 710, and/or other types or instances of data 712 that can be stored at the Internet-of-things device 116. The data 712 can include, for example, applications or program modules such as, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, authentication applications, identity-management applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the Internet-of-things device 116 is a special-purpose device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The Internet-of-things device 116 also can include an input/output ("I/O") interface 716. The I/O interface 716 can be configured to support the input/output of data such as location information, storing certificates 122, flashing the universal integrated circuit card 120, storing identity modules, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet port, a telephone port, a proprietary port, combinations thereof, or the like. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the Internet-of-things device 116 and a network device or local device.

The Internet-of-things device 116 also can include a communications component 718. The communications component 718 can be configured to interface with the processor 704 to facilitate wireless communications with one or more networks such as the cellular network 124 and/or the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718 can include one or more transceivers. The one or more transceivers can be configured to support communications with the cellular network 124 via the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The Internet-of-things device 116 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the Internet-of-things device 116 may be provided by an audio I/O component 726. The audio I/O component 726 of the Internet-of-things device 116 can include one or more speakers for the output of audio signals, one or more microphones for the collection and/or input of audio signals, and/or other audio input and/or output devices.

The illustrated Internet-of-things device 116 also can include a SIM system 728. The SIM system 728 can include a universal SIM ("USIM"), a universal integrated circuit card such as the universal integrated circuit card 120 illustrated and described herein, and/or other identity devices. In various embodiments, the SIM system 728 can be provided by a software module. In some embodiments, the SIM system 728 also can store one or more certificates 122 as illustrated and described herein. In some embodiments, the SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the Internet-of-things device 116 are contemplated, it should be understood that these embodiments are illustrative, and should not be construed as being limiting in any way.

The Internet-of-things device 116 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The Internet-of-things device 116 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The Internet-of-things device 116 also can include one or more location components 736. The location components 736 can be configured to send and/or receive signals to determine a geographic location of the Internet-of-things device 116. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the Internet-of-things device 116. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the Internet-of-things device 116. Using the location component 736, the Internet-of-things device 116 can generate and/or receive data to identify its geographic location, or to transmit data used by other devices to determine the location of the Internet-of-things device 116. The location component 736 may include multiple components for determining the location and/or orientation of the Internet-of-things device 116.

The illustrated Internet-of-things device 116 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the Internet-of-things device 116 can include additional and/or alternative components, the above embodiment should be understood as being illustrative of one possible operating environment for various embodiments of the concepts and technologies described herein. The described embodiment of the Internet-of-things device 116 is illustrative, and should not be construed as being limiting in any way.

Figure 8:
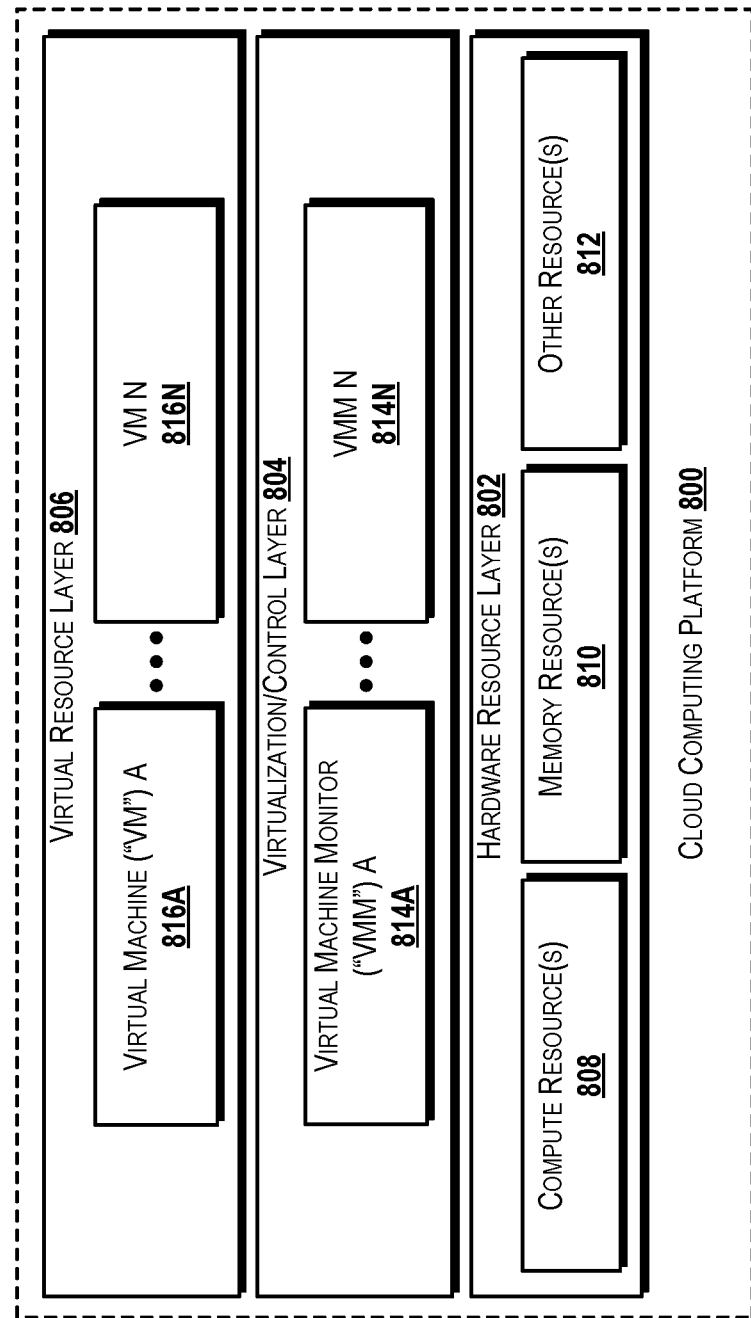
FIG. 8 is a diagram illustrating a computing environment capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein and/or for interacting with the security management service 106. Thus, it can be appreciated that in some embodiments of the concepts and technologies disclosed herein, the cloud computing platform 800 illustrated in FIG. 8 can be used to provide the functionality described herein with respect to the server computer 102 and/or one or more components of the network infrastructure 130.

The cloud computing platform 800 thus may be utilized to execute any aspects of the software components presented herein. Thus, according to various embodiments of the concepts and technologies disclosed herein, the security management service 106, the credential manager 108, the routing controller 110, and/or one or more components of the network infrastructure 130 can be implemented, at least in part, on or by elements included in the cloud computing platform 800 illustrated and described herein. Those skilled in the art will appreciate that the illustrated cloud computing platform 800 is a simplification of but only one possible implementation of an illustrative cloud computing platform, and as such, the illustrated cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 808 can include one or more hardware components that can perform computations to process data, and/or to execute computer-executable instructions of one or more application programs, operating systems, services, and/or other software including, but not limited to, the security management service 106, the credential manager 108, the routing controller 110, and/or one or more components of the network infrastructure 130 illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that an SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, California, and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the security management service 106, the credential manager 108, the routing controller 110, and/or one or more components of the network infrastructure 130 or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the identity database 112, the device inventory 114, the universal integrated circuit card 120, the certificate 122, the registration data 126, the resource access request 134, the session data 136, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for providing and using a security management service for Internet-of-things devices have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
obtaining, from an Internet-of-things device and via a portion of a cellular network, registration data, wherein obtaining the registration data corresponds to a request by the Internet-of-things device to register with the cellular network, wherein the Internet-of-things device comprises a cellular transceiver and a universal integrated circuit card that stores a unique identifier for the Internet-of-things device,
obtaining, from the registration data, identity data that comprises the unique identifier for the Internet-of-things device,
in response to determining, based on the identity data and behavioral data that describes activity associated with the Internet-of-things device, that the Internet-of-things device is operating normally, allowing the Internet-of-things device to register with the cellular network,
receiving, from the Internet-of-things device and via the cellular network, a request for the Internet-of-things device to access a resource via another network,
obtaining, from an identity database, corroborating identify information that identifies the Internet-of-things device,
analyzing the behavioral data, the identity data, and the corroborating identity information to determine if the access requested is to be granted, wherein the access is to be granted if the Internet-of-things device is operating normally and as expected and that the Internet-of-things device is not under control of any unauthorized entity, and in response to determining that the access requested is to be granted, allowing the Internet-of-things device to access the resource via the cellular network.

2. The system of claim 1, wherein the corroborating identity information comprises an address associated with the Internet-of-things device, the address comprising an IP address or a MAC address.

3. The system of claim 1, wherein the computer-executable instructions, when executed by the processor, cause the processor to perform operations further comprising:
determining if the resource requires a certificate associated with the Internet-of-things device to allow the Internet-of-things device to access the resource; and
if a determination is made that the resource requires the certificate, providing the certificate to the resource, wherein the certificate is obtained with the registration data and from the universal integrated circuit card.

4. The system of claim 1, wherein the computer-executable instructions, when executed by the processor, cause the processor to perform operations further comprising:
determining a routing for session data exchanged between the Internet-of-things device and the resource during a session, the routing comprising a direct connection between the Internet-of-things device and the resource via the cellular network and the other network.

5. The system of claim 1, wherein the computer-executable instructions, when executed by the processor, cause the processor to perform operations further comprising:
determining a routing for session data exchanged between the Internet-of-things device and the resource during a session, the routing comprising an indirect connection between the Internet-of-things device and the resource, the indirect connection comprising communications via the cellular network, a server computer that executes a security management service, and the other network.

6. The system of claim 1, wherein the resource comprises a cloud application.

7. The system of claim 1, wherein the Internet-of-things device stores a certificate in the universal integrated circuit card at the Internet-of-things device, wherein the certificate is stored in a secure memory of the universal integrated circuit card.

8. A method comprising:
obtaining, at a server computer comprising a processor and from an Internet-of-things device and via a portion of a cellular network, registration data, wherein obtaining the registration data corresponds to a request by the Internet-of-things device to register with the cellular network, wherein the Internet-of-things device comprises a cellular transceiver and a universal integrated circuit card that stores a unique identifier for the Internet-of-things device;
obtaining, by the processor and from the registration data, identity data that comprises the unique identifier for the Internet-of-things device;
in response to determining, by the processor and based on the identity data and behavioral data that describes activity associated with the Internet-of-things device, that the Internet-of-things device is operating normally, allowing the Internet-of-things device to register with the cellular network;
receiving, by the processor and from the Internet-of-things device and via the cellular network, a request for the Internet-of-things device to access a resource via another network;
obtaining, by the processor and from an identity database, corroborating identify information that identifies the Internet-of-things device;
analyzing, by the processor, the behavioral data, the identity data, and the corroborating identity information to determine if the access requested is to be granted, wherein the access is to be granted if the Internet-of-things device is operating normally and as expected and that the Internet-of-things device is not under control of any unauthorized entity; and
in response to determining that the access requested is to be granted, allowing, by the processor, the Internet-of-things device to access the resource via the cellular network.

9. The method of claim 8
wherein the corroborating identity information comprises an address associated with the Internet-of-things device, the address comprising an IP address or a MAC address.

10. The method of claim 8, further comprising:
determining if the resource requires a certificate associated with the Internet-of-things device to allow the Internet-of-things device to access the resource; and
if a determination is made that the resource requires the certificate, providing the certificate to the resource, wherein the certificate is obtained with the registration data and from the universal integrated circuit card.

11. The method of claim 8, further comprising:
determining a routing for session data exchanged between the Internet-of-things device and the resource during a session, the routing comprising a direct connection between the Internet-of-things device and the resource via the cellular network and the other network.

12. The method of claim 8, further comprising:
determining a routing for session data exchanged between the Internet-of-things device and the resource during a session, the routing comprising an indirect connection between the Internet-of-things device and the resource, the indirect connection comprising communications via the cellular network, the server computer, and the other network.

13. The method of claim 8, wherein the Internet-of-things device stores a certificate in the universal integrated circuit card at the Internet-of-things device, wherein the certificate is stored in a secure memory of the universal integrated circuit card.

14. A computer storage medium having computer-executable instructions stored thereon that, when executed by a processor, cause the processor to perform operations comprising:
obtaining, from an Internet-of-things device and via a portion of a cellular network, registration data, wherein obtaining the registration data corresponds to a request by the Internet-of-things device to register with the cellular network, wherein the Internet-of-things device comprises a cellular transceiver and a universal integrated circuit card that stores a unique identifier for the Internet-of-things device;
obtaining, from the registration data, identity data that comprises the unique identifier for the Internet-of-things device;
in response to determining, based on the identity data and behavioral data that describes activity associated with the Internet-of-things device, that the Internet-of-things device is operating normally, allowing the Internet-of-things device to register with the cellular network;

receiving, from the Internet-of-things device and via the cellular network, a request for the Internet-of-things device to access a resource via another network;

obtaining, from an identity database, corroborating identify information that identifies the Internet-of-things device;

analyzing the behavioral data, the identity data, and the corroborating identity information to determine if the access requested is to be granted, wherein the access is to be granted if the Internet-of-things device is operating normally and as expected and that the Internet-of-things device is not under control of any unauthorized entity; and in response to determining that the access requested is to be granted, allowing the Internet-of-things device to access the resource via the cellular network.

15. The computer storage medium of claim 14, wherein the corroborating identity information comprises a data network name, a location area code, or a tracking area code.

16. The computer storage medium of claim 14, wherein the computer-executable instructions, when executed by the processor, cause the processor to perform operations further comprising:

determining if the resource requires a certificate associated with the Internet-of-things device to allow the Internet-of-things device to access the resource; and if a determination is made that the resource requires the certificate, providing the certificate to the resource, wherein the certificate is obtained with the registration data and from the universal integrated circuit card.

17. The computer storage medium of claim 14, wherein the computer-executable instructions, when executed by the processor, cause the processor to perform operations further comprising:

determining a routing for session data exchanged between the Internet-of-things device and the resource during a session, the routing comprising a direct connection between the Internet-of-things device and the resource via the cellular network and the other network.

18. The computer storage medium of claim 14, wherein the computer-executable instructions, when executed by the processor, cause the processor to perform operations further comprising:

determining a routing for session data exchanged between the Internet-of-things device and the resource during a session, the routing comprising an indirect connection between the Internet-of-things device and the resource, the indirect connection comprising communications via the cellular network, a server computer that executes a security management service, and the other network.

19. The computer storage medium of claim 14, wherein the resource comprises network infrastructure associated with the other network.

20. The computer storage medium of claim 14, wherein the Internet-of-things device stores a certificate in the universal integrated circuit card at the Internet-of-things device, wherein the certificate is stored in a secure memory of the universal integrated circuit card.

* * * * *